United States Patent
Cabrera et al.

[11] Patent Number: 5,978,815
[45] Date of Patent: Nov. 2, 1999

[54] FILE SYSTEM PRIMITIVE PROVIDING NATIVE FILE SYSTEM SUPPORT FOR REMOTE STORAGE

[75] Inventors: Luis Felipe Cabrera, Bellevue; Gary D. Kimura, Kirkland; Thomas J. Miller, Bellevue; Brian D. Andrew, Redmond, all of Wash.

[73] Assignee: Microsoft Corporation, Redmond, Wash.

[21] Appl. No.: 08/874,787

[22] Filed: Jun. 13, 1997

[51] Int. Cl.[6] .................................................. G06F 17/30
[52] U.S. Cl. ........................... 707/204; 707/10; 707/200
[58] Field of Search ........................... 707/10, 200, 203, 707/204, 7, 8; 395/828

[56] References Cited

U.S. PATENT DOCUMENTS

| | | | |
|---|---|---|---|
| 5,276,867 | 1/1994 | Kenley et al. | 707/204 |
| 5,367,671 | 11/1994 | Feigenbaum et al. | 707/1 |
| 5,537,585 | 7/1996 | Blickenstaff et al. | 707/205 |
| 5,617,568 | 4/1997 | Ault et al. | 707/101 |
| 5,628,007 | 5/1997 | Nevarez | 707/102 |
| 5,675,781 | 10/1997 | Duncan et al. | 707/8 |
| 5,689,701 | 11/1997 | Ault et al. | 707/10 |

Primary Examiner—Paul R. Lintz
Attorney, Agent, or Firm—Workman, Nydegger, Seeley

[57] ABSTRACT

In order to decrease the overall cost of storing large amounts of data, systems have been developed that use a hierarchy of storage devices from fast local disks to archival off-line storage. Such storage devices may be managed in a hierarchy where data that is accessed only infrequently can be moved to archival storage. The present invention relies on a tight integration of a hierarchical storage manager into the I/O system so that remotely stored attributes can be identified and tracked internally to the I/O system just like any other attributes. Implementations of the present invention may rely on a layered driver model where lower level drivers detect the existence of files with remotely stored attributes and then transfer control for processing I/O requests involving files with remotely stored attributes to higher level drivers. The higher level drivers then assume control to finish processing the I/O request.

19 Claims, 8 Drawing Sheets

FILE SYSTEM PRIMITIVE PROVIDING NATIVE FILE SYSTEM SUPPORT FOR REMOTE STORAGE

BACKGROUND OF THE INVENTION

1. The Field of the Invention

The present invention relates to systems and methods for providing support for remote storage in a file system. More specifically, the present invention allows a file system to provide native support for remote storage so that the file system can intrinsically identify and process I/O requests involving files or other entities where a portion of the files or entities are stored remotely.

2. The Prior State of the Art

Many advances have been made in computer hardware and software, but some general principles have remained constant. Although the cost of memory and data storage has continued to decrease, and the storage capacity of devices of a given size has continued to increase, there continues to be a difference in the cost of storing data depending on several factors such as the medium used to store the data, and the accessibility of the data. For example, it is generally more expensive to store a data word in cache memory then in system RAM. System RAM, in turn, is more expensive per storage word than magnetic disk storage. Magnetic disk storage is more expensive per storage word than archival storage. Thus, there continues to be motivation to move unused or less frequently used data to less expensive storage. In addition, the desire to access an ever increasing amount of data provides motivation to store data in a cost-effective manner while, simultaneously, providing adequate access speed to the desired data.

Prior art attempts at developing and implementing remote storage of data are based on a mainframe computing model with a separate, non-integrated hierarchical storage system. The hierarchical storage system administers the placement of units of storage, called datasets, in a hierarchy of storage devices. The hierarchy of storage devices may include a wide range of devices such as high end, high throughput magnetic disks, collections of normal disks, jukeboxes of optical disks, tape silos, and collections of tapes that are stored off-line. When deciding where various datasets should be stored, hierarchical storage systems typically balance various considerations, such as the cost of storage, the time of retrieval, the frequency of access, and so forth.

Files typically have various components such as a data portion where a user or other software entity can store data, a name portion, and various flags that may be used for such things as controlling access to the file. In prior art systems, files that are removed from primary storage and migrated to remote storage are often replaced with a "stub file," which contains information that allows the hierarchical storage system to determine where the data in the file has been stored. Such an approach, however, has several problems.

A stub file stores information describing the location of the remotely stored file in the data portion of the file. Traditional file systems are not generally set up to allow the file system to determine the contents of the data portion of a file. Therefore, prior art systems relied on a non-integrated hierarchical storage manager to read the data portion of stub files and determine where a remotely stored file is located. Such a non-integrated approach requires that the hierarchical storage system intercept any I/O operations that are directed to files that have the same appearance as a stub file. In other words, it is impossible to tell from looking at a file whether it is a stub file or a non-stub file that simply happens to have the same appearance as a stub file. For example, stub files often have a fixed length. Beyond this fixed length, however, there is nothing external to distinguish a stub file from a normal file that just happens to have the identical length of a stub file. In order to identify all stub files, a hierarchical storage manager is typically set to intercept all calls directed to files that have the same length as a stub file. Once a call is intercepted, the file can then be examined to determine whether it is indeed a stub file or a normal file that just happens to be of the same length.

It is apparent from the above discussion that there is a certain probability that a non-stub file will be examined by a hierarchical storage manager. This result is undesirable since it slows access to normal files and causes additional unnecessary processing overhead. Prior art systems have attempted to eliminate this overhead by employing different methods to differentiate a stub file from a user file that has the same number of data bytes, yet is a normal data file. These various approaches can reduce the probability of error, but cannot totally eliminate it. It would, therefore, be an advancement in the art to provide a hierarchical storage manager that can positively differentiate between normal data files and data files with remotely stored data. It would also be an advancement in the art to have a hierarchical storage manager that incurred the additional overhead associated with remotely stored files only when such remotely stored files were actually involved in an I/O operation processed by an I/O system.

One advantage of prior art hierarchical storage managers, is that the non-integrated nature of the hierarchical storage manager allows hierarchical storage to be implemented in a system with little or no impact on the existing file system. Such a hierarchical storage manager can examine each call to determine if it involves a stub file. If the call involves a stub file, then the hierarchical storage manager can intercept the call and handle the call. If, however, the call does not involve a stub file, then the hierarchical storage manager can pass the call along to the regular file system. Thus, the file system does not need to know that a hierarchical storage manager exists. Unfortunately, such an approach provides additional overhead for each call that is made even if the call does not involve a stub file. This is because each call must be examined by a hierarchical storage manager. If a system employs multiple hierarchical storage managers, the overhead can rapidly compound. It would, therefore, be desirable to provide a hierarchical storage manager which maintains the benefits of causing little or no change to the existing file system while, simultaneously, minimizing or eliminating any overhead for files without remotely stored data. In other words, it would be very advantageous to have an approach to hierarchical storage that maintained existing access speeds for files without remotely stored data and only incurred additional overhead for files with remotely stored data. It would be extremely advantageous to maintain all these properties even when a plurality of hierarchical storage managers were used in a single system.

Another disadvantage of prior art methods of hierarchical storage management is that the model upon which they are based does not readily allow for incorporation and adaptation to new storage requirements. For example, prior art methods of storing data remotely involved replacement of a normal file with a stub file. Such a stub file replaces virtually all the components of a normal file with those of the stub file. Therefore, when any operation involves the normal file, it typically has to be retrieved from remote storage in order to fulfill the request. It would be very advantageous to allow a greater degree of flexibility in determining what information associated with a particular file is stored remotely so that operations that are likely to be performed with greater frequency may be handled without recalling the entirety of the file from remote storage.

SUMMARY AND OBJECTS OF THE INVENTION

The foregoing problems in the prior state of the art have been successfully overcome by the present invention, which is directed to a system and method for remote data storage which provides native support in the file system for remote data storage while, simultaneously, minimizing any changes that must be made to an existing file system to incorporate such native capability.

The present invention may rely on a model where a plurality of drivers or data managers cooperate to fill an I/O request. The drivers or data managers may have a layered relationship where each driver or data manager is responsible for processing a particular portion of an I/O request. Information may be passed from one layer to another so that all layers cooperate to completely fill an I/O request.

The present invention recognizes that files and directories typically have two broad categories of components or "attributes." One category of attributes is typically used to store user controlled information. This user attribute category includes the data portion of a file, where a user or other client process stores desired information. Another group of attributes are typically set aside for primary or exclusive use by the I/O system. These system attributes may include access control information which identifies which users or client processes may access the file and in what manner (e.g. read-only access, read-write access, and so forth). Other attributes reserved for primary or exclusive access by the I/O system may include information that allows the file system to identify where on the local storage medium the main data attributes are stored. The present invention adds an additional system attribute called a remote storage attribute. This remote storage attribute contains sufficient information to allow the I/O system to identify where remotely stored attributes of the file or directory may be found.

In the most general aspect of the invention, any or all of the file attributes may be stored remotely. This degree of flexibility allows information that is used more often to be kept locally, and information that is used less often to be stored remotely. The local/remote storage decision can be made on an attribute by attribute basis. Sufficient information must remain in local storage, however, to allow the I/O system to identify which attributes are stored remotely and where the remotely stored attributes are located.

In one embodiment of the present invention, the layered driver model previously described is utilized to implement the present invention. Such an implementation may comprise, for example, one or more file system drivers that can access information stored on local storage media. At least one of the file system drivers is adapted to identify the remote storage attribute of a file when it is present. This file system driver may then extract any information stored in the remote storage attribute and pass that information to a hierarchical storage manager. The hierarchical storage manager can then assume responsibility for completing the I/O request. In some instances, the hierarchical storage manager may be able to completely process the I/O request itself or may be able to process the I/O request using information stored in the remote storage attribute or on the local storage media. In such instances, it would not be necessary for the hierarchical storage manager to recall the remotely stored attributes from their remote storage locations.

In instances where the hierarchical storage manager could not process the I/O request without recalling remotely stored attributes, the hierarchical storage manager can generate recall information and pass it to the appropriate driver or component to recall the required information. If the information is stored in a manner that it can be retrieved without human intervention, such a recall procedure may involve issuing an I/O request to a driver or other data manager which would then initiate the recall procedure and, once the data was retrieved, pass the appropriate information to the hierarchical storage manager. In the alternative, the hierarchical storage manager may need to alert an operator or other individual to retrieve and load the appropriate media so that the information can be accessed. The overall structure of the invention provides a great deal of flexibility in supporting a wide variety of storage models and storage hierarchies.

From the above summary, it should be apparent that a wide variety of hierarchical storage managers may be implemented and incorporated into an existing system without introducing any additional overhead into I/O requests that access files or directories with no remotely stored attributes. This is because such I/O requests are processed without involving the hierarchical storage managers. The file system drivers are able to absolutely determine that a file involves no remotely stored attributes and then proceed to fill the I/O request in the traditional manner. However, when a file with remotely stored attributes is encountered, the file system driver passes the appropriate information to the hierarchical storage manager which then assumes responsibility for processing the I/O request. In this implementation, support for remotely stored data can be viewed as an interruption of the normal sequence of processing by a mechanism which allows a software component that would not normally participate in the I/O processing to intervene and assume control for processing the I/O request.

In one embodiment, a remote storage attribute has both a tag and a data value. The tag is used to identify the hierarchical storage manager that is the "owner" of the remote storage attribute. In general the owner of the remote storage attribute is responsible for processing either all or part of an I/O request involving the associated file. The data value contains data stored therein by the owner of the remote storage attribute. An owner may use the value of the remote storage attribute to store any information that is necessary or helpful to properly complete an I/O request involving the associated file. For example, it is anticipated that many, if not most, hierarchical storage managers will use such a data value to store the location of remotely stored attributes. In addition, the data value may be used to store which attributes are stored locally and which attributes are stored remotely.

When a plurality of layered drivers are used, if a file system driver identifies a remote storage attribute, the driver can extract the tag and the value of the remote storage attribute. This tag and value, along with other information, may then be passed to other layered drivers until a hierarchical storage manager identifies itself as the owner of the remote storage attribute. The owner of the remote storage attribute may then assume control for processing the I/O request and may completely process the I/O request, or may make use of other drivers or components in order to completely process the I/O request.

Such an implementation provides an extremely flexible framework which allows multiple hierarchical storage managers to coexist in a single system. Each hierarchical storage manager could then process I/O requests involving its own individual remotely stored attributes. Such an implementation achieves a great degree of overhead isolation so that adding additional hierarchical storage managers to the system in order to process particular types of files does not greatly add to the overhead associated with I/O requests involving files or directories with remotely stored attributes.

Accordingly, it is a primary object of this invention to provide a system and method for remote storage that achieves a tight integration between hierarchical storage managers and other drivers and components in the I/O system. It is another object of this invention to provide a system and method for remote data storage that allows a plurality of hierarchical storage managers to coexist within a system without greatly increasing the overhead associated with processing I/O requests. It is still another object of the present invention to provide a robust, extensible architecture which allows a great degree of flexibility in selecting which attributes are stored locally and which attributes are stored remotely.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not, therefore, to be considered to be limiting of its scope, the invention will be described and explained with additional specificity and detail through the use of the accompanying drawings in which.

DETAILED DESCRIPTION OF THE PREFERRED EMBODIMENTS

Figure 1:
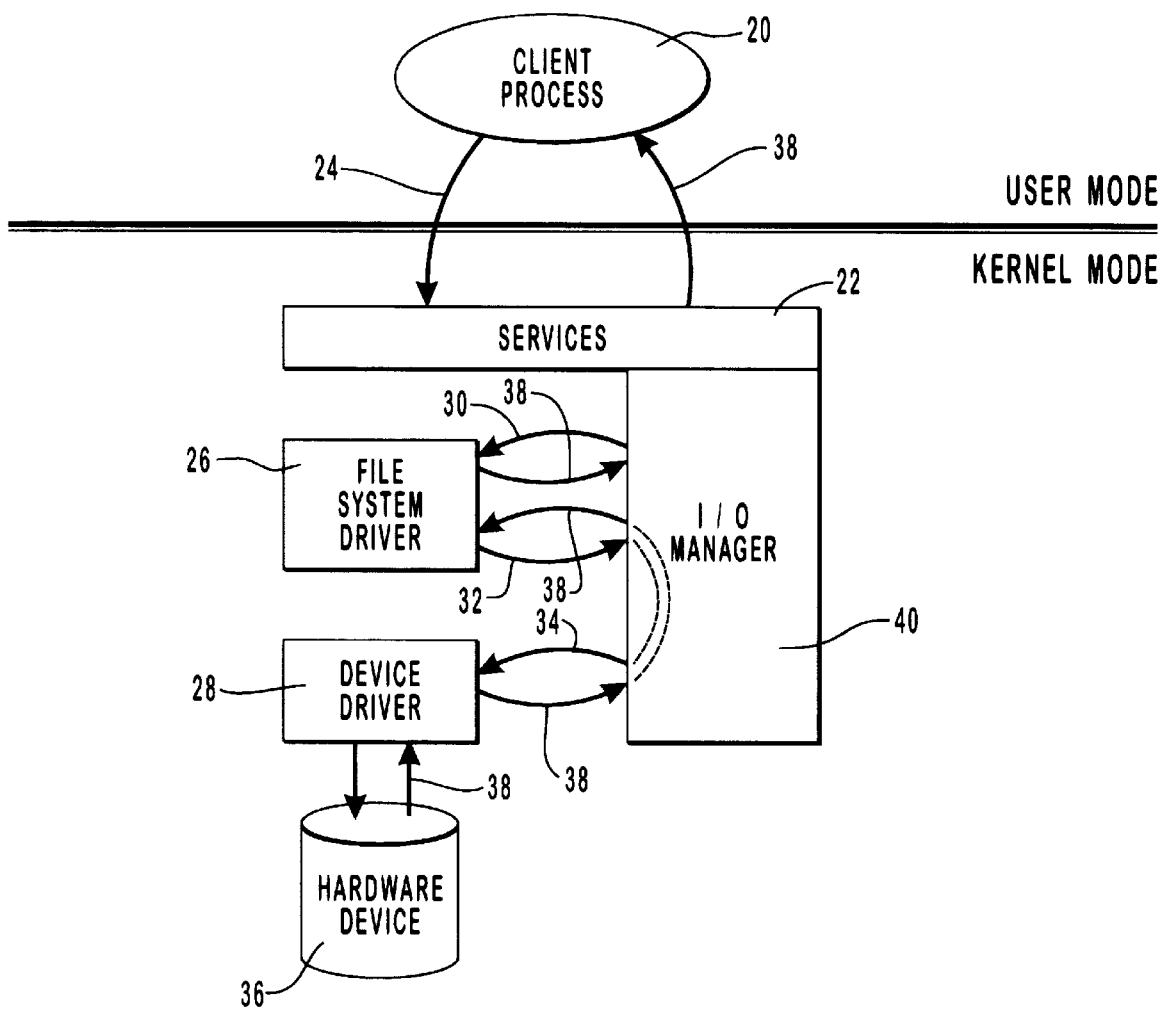
FIG. 1 is a diagram representing an I/O system employing layered drivers.

The invention is described below by using diagrams to illustrate either the structure or processing of embodiments used to implement the system and method of the present invention. Using the diagrams in this manner to present the invention should not be construed as limiting of its scope. The present invention contemplates both methods and systems for implementing remote storage of data as a native component of the file system. The embodiments of the present invention may comprise a special purpose or general purpose computer comprising standard computer hardware such as one or more central processing units (CPU) or other processing means for executing computer executable instructions, computer readable media for storing executable instructions, a display or other output means for displaying or outputting information, a keyboard or other input means for inputting information, and so forth.

The present invention contemplates that a hierarchy of storage devices will be available to the system. Such a hierarchy of storage devices may comprise any number or type of storage media including, but not limited to, high-end, high throughput magnetic disks, one or more normal disks, optical disks, jukeboxes of optical disks, tape silos, and/or collections of tapes that are stored off-line. In general, however, the various storage devices may be partitioned into two basic categories. The first category is local storage which contains information that is locally available to the computer system. The second category is remote storage which includes any type of storage device that contains information that is not locally accessible to a computer system. While the line between these two categories of devices may not be well defined, in general, local storage has a relatively quick access time and is used to store frequently accessed data while remote storage has a much longer access time and is used to store data that is accessed infrequently. The capacity of remote storage is also typically an order of magnitude larger than the capacity of local storage.

Embodiments within the scope of the present invention also include computer readable media having executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions or data fields and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Certain embodiments of the present invention may be implemented in a system which uses a plurality of driver means for performing I/O processing. In order to more fully understand the context of these embodiments, reference is now made to FIG. 1, which illustrates a simplified diagram of the interaction between a client process and an operating system having an I/O system that uses a plurality of driver means for performing I/O processing. This diagram is representative, for example, of the Microsoft Windows NT® operating system. The diagram of FIG. 1 may also represent any operating system which uses a plurality of driver means for performing I/O processing. In FIG. 1, client process 20 makes use of operating system services 22 to perform I/O requests. This is typically achieved by client process 20 making a call to an Application Program Interface (API)

function provided by the operating system. Calling the appropriate API function ultimately results in a call to operating system services 22. Such a call is illustrated by arrow 24.

In FIG. 1, client process 20 is illustrated as operating in "user" mode and the operating system services are illustrated as operating in "kernel" mode. Modern operating systems typically provide a robust environment for various application programs and intuitive user interfaces. Such operating systems normally have different operating levels or "modes," depending on the level of sophistication of the operating system and the security features that are implemented by the operating system. Normal application programs typically run at the lowest priority and have a full complement of security devices in place to prohibit interference with other applications, or with other layers of the operating system. Hardware and other services provided by the operating system are only accessed through controlled interfaces or mechanisms which limit the ability of a user application or other process in the user mode to "crash" the system. The lowest priority mode is typically referred to as user mode and is the mode that most computer users are familiar with. Because of the close integration of drivers with their associated hardware and because of the time critical nature of the tasks that many drivers perform, drivers typically run in an operating system mode that has a much higher priority and much lower security protection. This mode is generally referred to as "kernel" mode. Placing the drivers and other operating system services in kernel mode allows the operating system to run at a higher priority and perform many functions that would not be possible from user mode.

When client process 20 calls operating system services 22 in order to perform an I/O request, the I/O request is passed to a first driver means for performing I/O processing. In FIG. 1, file system driver 26 and device driver 28 represent examples of driver means for performing I/O processing. The passing of the I/O request to the first driver means is illustrated in FIG. 1, for example, by arrow 30. File system driver 26 will then take the I/O request and generally perform partial processing of the I/O request before passing the I/O request on to the next driver.

As an example, suppose client process 20 wished to open a particular file on hardware device 36 and retrieve or store information from the file. The I/O request would pass from client process 20 to operating system services 22 and on to file system driver 26. File system driver 26 would then translate the I/O request from a file name to a particular location on hardware device 36. The translation process may also include the number of data blocks that should be read from or written to the hardware device at that particular location. This information can then be passed to the next driver, as for example, device driver 28. The process of passing the information required by device driver 28 is illustrated in FIG. 1 by arrows 32 and 34. Device driver 28 takes the location and number of data blocks to be read or written and translates them to the appropriate control signals to retrieve the desired information from or to store the desired information to hardware device 36. The data retrieved may then be passed from device driver 28 to file system driver 26 and ultimately back to client process 20 as indicated by return arrows 38. Status information may be returned in the same manner.

In FIG. 1, I/O requests are not passed directly between file system driver 26 and device driver 28. Rather, the I/O requests are passed between the drivers via I/O manager 40. It is, however, not necessary to have an I/O manager in all implementations. Embodiments may also exist where I/O requests are passed directly from one driver to another without an I/O manager to coordinate transfer.

Figure 2:
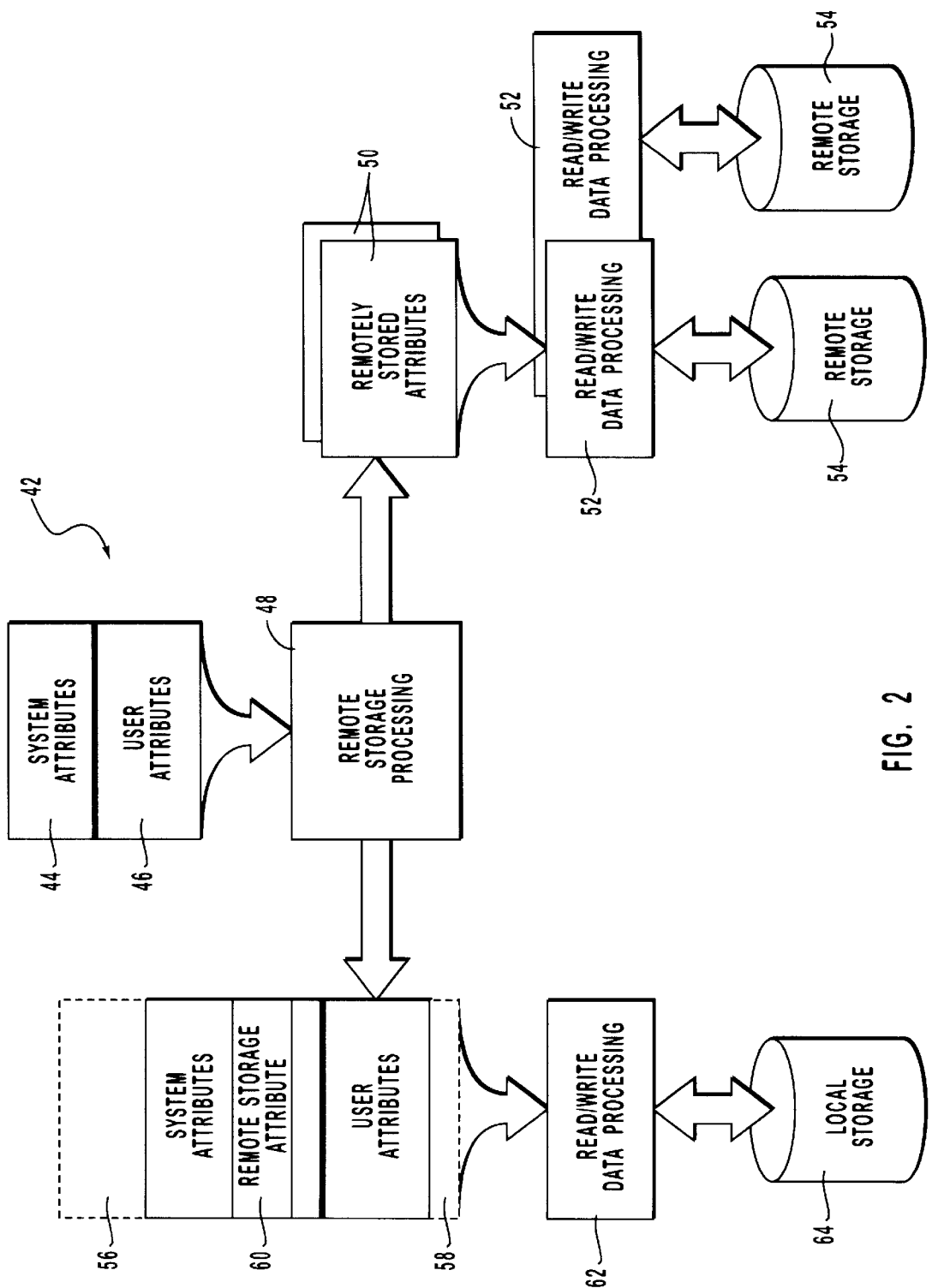
FIG. 2 is a diagram illustrating the process of storing attributes remotely.

Referring next to FIG. 2, a generalized diagram of the process of remotely storing some attributes of a file and locally storing other attributes of a file is presented. As illustrated in FIG. 2, a file, illustrated generally as 42, may comprise system attributes 44 and user attributes 46. As discussed in greater detail below, system attributes are those attributes used primarily or exclusively by the operating system and I/O system to store information necessary or useful to allow the operating system and I/O system to perform their various tasks. An example of a system attribute would be the security or access control information for a file or directory. User attributes are attributes that are used by a user or other client process for its own purposes. The data attribute of a file is a good example of a user attribute. System attributes and user attributes are discussed in greater detail below.

File 42 is examined by remote storage processing block 48. Remote storage processing block 48 is responsible for deciding which attributes of file 42 should be stored remotely, and where the remotely stored attributes will be stored. In making these decisions, remote storage processing block 48 may consider numerous factors. Such factors may include, for example, the frequency with which the attribute has been accessed. In general, data which is accessed very infrequently may be moved to remote storage on the theory that if the data has not been accessed in a long time, then it is unlikely that it will be accessed anytime in the near future. Size is another factor that may be considered by remote storage processing block 48. If an attribute consumes very little local storage space, then not much is gained by moving the attribute to remote storage. On the other hand, if an attribute consumes a large amount of local storage space, then moving the attribute to remote storage frees up a large amount of local storage and such a move may be valuable if local storage space is at a premium.

Numerous other factors may also come into play in deciding which attributes to store remotely and where to store the attributes. Such factors may include, for example, the time to access the remote storage medium. For example, access time may not be increased significantly if an attribute is moved from local storage to an optical jukebox. Perhaps the time necessary to select an load the proper optical disk and retrieve the information therefrom would not be significant. On the other hand, if an attribute was moved to off-line tape storage, which had to be retrieved and manually loaded by an operator, the retrieval time may be significant. In general, when deciding which attributes to store remotely and where such attributes should be stored, remote storage processing block 48 will optimize different parameters such as the overall cost effectiveness of storage as well as the response time of I/O for different classes of applications. The exact methodology utilized to select which attributes are stored remotely and where such attributes are to be stored is not defined by this invention. This invention can be used to achieve whatever remote storage goals are desired.

Embodiments within the scope of this invention may implement the general processing described in conjunction with remote storage processing block 48 in a variety of ways. As described in greater detail below, the functions of remote storage processing block 48 may be implemented by a driver means for performing I/O processing. Such a driver means may be separate from any other driver means in an I/O system. In the alternative, the functions of remote storage processing block 48 may be incorporated into a multipurpose or monolithic driver means used in the I/O system. As will become more apparent in the discussion hereafter, all that is important for the present invention is to incorporate the functions of remote storage processing block 48 into the I/O system in such a way that the I/O system contains native support for remote storage and need not rely on a non-integrated component such as described in the prior art.

After remote storage processing block 48 determines which attributes of file 42 should be stored remotely and where such attributes are to be stored, remote storage processing block 48 assembles the attributes in an appropriate format and initiates steps to transfer the attributes to remote storage. In FIG. 2, this procedure is illustrated generally by remotely stored attributes 50, read/write data processing blocks 52, and remote storage 54. A plurality of remotely stored attributes 50, read/write data processing blocks 52 and remote storage 54 is illustrated to emphasize that remotely stored attributes from a particular file need not be stored in the same location or even on the same type of remote storage device. In FIG. 2, each block labeled 50 may contain one or more attributes that are to be stored remotely. The inherent flexibility of the present invention allows remote storage processing block 48 to make decisions on an attribute by attribute basis so that individual attributes may be stored in the most appropriate location. Such flexibility obviously includes the ability to store all attributes of a particular file in the same location.

Remotely stored attributes 50, read/write data processing blocks 52 and remote storage 54 illustrate a conceptual data flow path which simply requires the appropriate data to be transferred and stored on the appropriate remote storage device using whatever mechanisms exist to access the particular remote storage device. As will be illustrated by more detailed examples below, read/write data processing block 52 may be implemented using a single driver means for performing I/O processing, if the corresponding remote storage device is directly accessible by the system where remote storage processing block 48 resides, or may be several driver means for performing I/O processing running on multiple computers across networks or other means for communicating between multiple computer systems. All that is required is that the appropriate data be passed and stored on the appropriate remote storage device. In general, the mechanism used to implement read/write data processing block 52 will depend, in large measure, upon the specific operating environment used to implement the present invention and upon the particular hardware and/or software needed to provide a data flow path between remote storage device 54 and the system where remote storage processing block 48 resides.

After remote storage processing block 48 determines which attributes are to be stored remotely and assembles the attributes in an appropriate data format, such as remotely stored attributes 50, the attributes may be safely removed from file 42. In some embodiments, it may be desirable to wait until remotely stored attributes 50 have been safely stored on remote storage before removing them from file 42. Removal of remotely stored attributes 50 is illustrated in FIG. 2 by dashed areas 56 and 58, which illustrate that both system attributes and user attributes may be stored remotely in accordance with the present invention. In addition, remote storage processing block 48 adds remote storage attribute 60 to the system attributes of file 42.

Although remote storage attribute 60 is discussed in greater detail below, remote storage attribute 60 is generally used to store whatever information is needed by remote storage processing block 48 to identify where remotely stored attributes 50 are located. In addition, remote storage attribute 60 may contain a wide variety of other information, depending upon the particular implementation of remote storage processing block 48. For example, it may be desirable to store which attributes are stored remotely in remote storage attribute 60. In the alternative, perhaps file 42 is structured in such a way that the identity of which attributes are stored remotely can be determined through other mechanisms. Similarly, other information may also be stored in remote storage attribute 60. For example, perhaps remote storage processing block 48 does not entirely trust the integrity of data stored in remote storage 54. In such a case, remote storage processing block 48 may calculate a digital fingerprint or signature on the remotely stored attributes and save the fingerprint or signature in remote storage attribute 60. Then when the remote attributes are retrieved, a second signature may be calculated on the remote attributes and the calculated signature compared to the signature stored in remote storage attribute 60. Such a procedure would allow remote storage processing block 48 to detect any changes made to remotely stored attributes as they were retrieved from remote storage 54.

As is apparent from the above discussion, any number or type of data needed or desired by remote storage processing block 48 can be stored in remote storage attribute 60. The important characteristic of remote storage attribute 60 is that it forms an inherent part of the state of file 42 that is tracked by the I/O system and managed in an integral fashion just like all other attributes of the file. This means that the file system can detect, track, manipulate, or otherwise operate on the remote storage attribute just like any other attribute in the file. Thus, utilities dealing with the files can now incorporate functionality to operate specifically on the remote storage attribute. For example, a directory listing could examine remote storage attribute 60 and identify the percentage of local storage space and the percentage of remote storage space occupied by all available files. In addition, utilities could be developed that would estimate the retrieval time necessary to access certain remotely stored data. Such a utility would allow a system manager to fine-tune or modify the operation of remote storage processing block 48 based on changing conditions or other criteria. Note that all this information may be compiled simply by examining the information stored locally. The present invention also provides a wide array of other benefits not available with prior art systems.

Remote storage attribute 60 is shown in FIG. 2 as being added to the system attributes portion of file 42. It is anticipated that remote storage attribute 60 will be protected from user modification for reasons that will become more apparent hereafter. Since remote storage attribute 60 is used to store information needed by remote storage processing block 48 to perform its various function, it should be protected from user modification and interference. It is, however, anticipated that at least part of the information stored in remote storage attribute 60 may occasionally be of interest to a user or other client process. In appropriate situations, such information may be made available to the user or client process. In rare circumstances it may be necessary to allow specialized client processes, such as utilities designed for system manager use, to be able to modify the information in remote storage attribute 60. Such occasional access by a specialized utility should not be construed as placing remote storage attribute 60 outside of the system attributes group. The primary use for remote storage attribute 60 is by the I/O system itself to accomplish the remote storage function and to integrate the remote storage functionality of the present invention into the file system itself.

Once remote storage attribute 60 is added to the file and the remotely stored attributes are removed from the file, the file may then be stored on local storage. This process is illustrated in FIG. 2 by read/write data processing block 62 and local storage 64. Read/write processing block 62 and local storage 64 are intended to represent a conceptual data flow path from remote storage processing block 48 to local storage 64. The exact implementation details will be dependent upon the particular operating environment selected to implement the present invention. As explained in greater detail below, read/write data processing block 62 may be implemented by a separate driver means for performing I/O processing or may be bundled with remote storage processing block 48 into a larger, more monolithic, driver means for performing I/O processing.

The example presented in FIG. 2 illustrates a particular file being examined by remote storage processing block 48 and decisions being made about which attributes to store locally and which attributes to store remotely and where the remotely stored attributes should be located. Note that such a procedure may be accomplished through whatever mechanism is appropriate for the system. For example, a utility could be scheduled to run periodically to examine local storage 64 for information that should be migrated to remote storage. Alternatively, the system may be set to examine each file as it is accessed. As yet another example, perhaps such a procedure is initiated only at the request of a user or a system manager. In essence, the present invention does not define when such procedures should be utilized, but simply describes the mechanism for migrating information from local storage to remote storage.

Although the above discussion has specifically addressed how the present invention operates with respect to a file, the concepts of the present invention may be used with any locally stored entity that has a collection of attributes designed exclusively or primarily for use by the system. Thus, the example of files should be taken as exemplary in all respects and not as limiting the scope of this invention to any particular entity.

Figure 3:
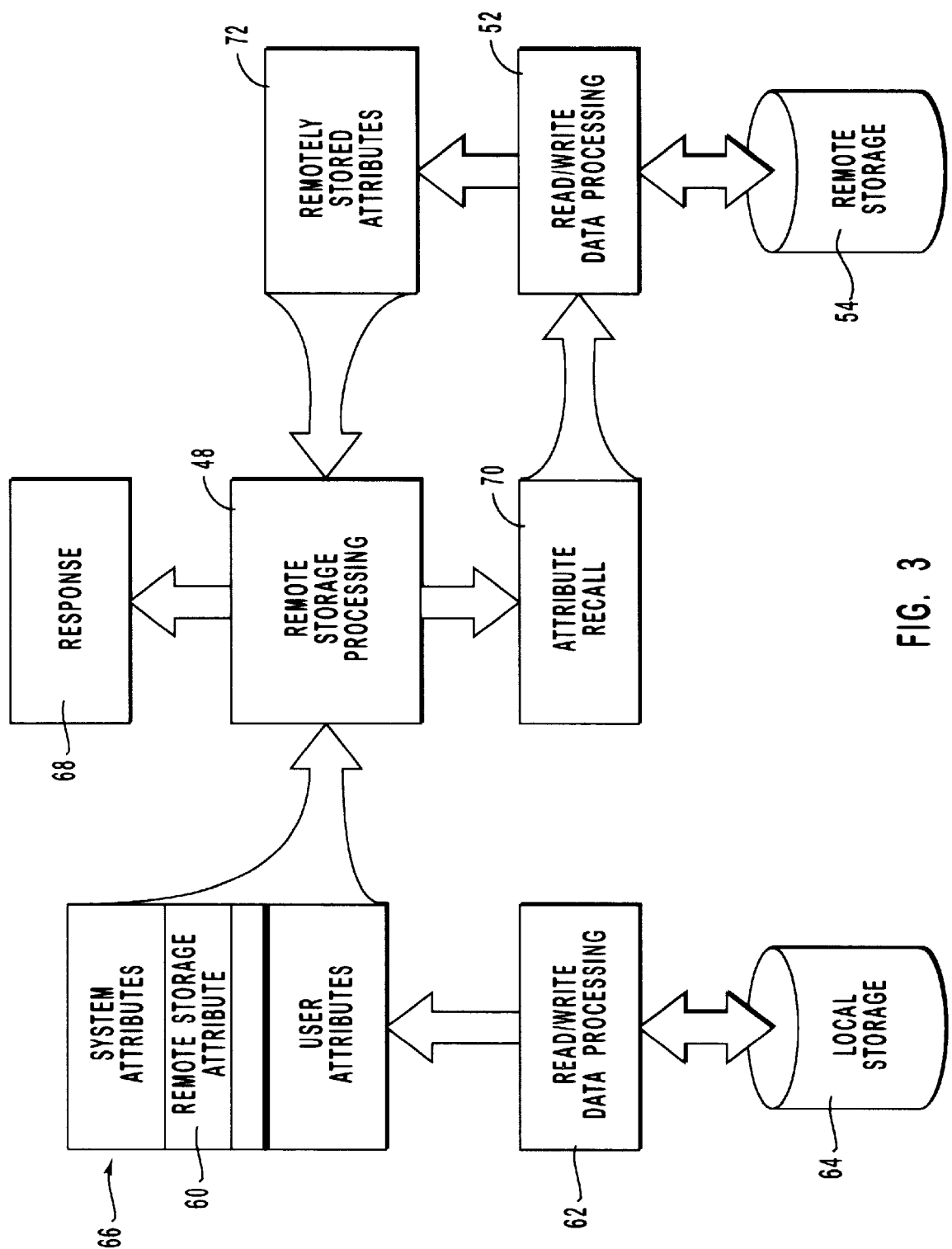
FIG. 3 is a diagram illustrating the processing of an I/O request involving remotely stored attributes.

Referring now to FIG. 3, a top level block diagram illustrating the processing of I/O requests involving files with remotely stored attributes is illustrated. In the context of this invention, an I/O request is any operation that may be performed by an I/O system that implements the present invention. Thus, the definition of I/O request goes far beyond the mere reading data from and writing to files. In some situations, an I/O request may trigger other actions not associated with traditional I/O operations, such as calling a phone number when a particular file is accessed. Within the context of this invention, the term is intended to be interpreted broadly.

When an I/O request involves a file or other entity that has remotely stored attributes, read/write data processing block 62 will be able to identify that remotely stored attributes are involved. This is because of the presence of remote storage attribute 60. When such an attribute is detected, information in remote storage attribute 60 may be passed to remote storage processing block 48. Remote storage processing block 48 may then determine what needs to be done to process the I/O request. Various embodiments may pass various types of information to remote storage processing block 48. For example, just the information in remote storage attribute 60 may be passed to remote storage processing block 48. Then, if remote storage processing block 48 needs other information from local storage 64, remote storage processing block 48 may request that read/write data processing block 62 retrieve the desired information. Alternatively, more information may be initially passed to remote storage processing block 48. Such details are considered to be design choices that are not critical to the present invention. In FIG. 3, the process of passing information retrieved from local storage 64 to remote storage processing block 48 is illustrated by file 66, which is passed to remote storage processing block 48.

Once remote storage processing block 48 receives remote storage attribute 60 and any other required information, remote storage processing block 48 can determine whether the I/O request can be processed using the information stored locally or whether processing the I/O request requires information to be retrieved from remote storage 54. The question as to whether the I/O request can be processed without retrieving information from remote storage 54 will depend upon the particular I/O request and the attributes that have been stored remotely.

As a particular example, consider an I/O system that implements content indexing of information accessible to the system. In such a system a user may retrieve information not by their particular address on the local or remote storage device but by key words or other content information. For example, a user may request all documents authored by a certain individual or all documents pertaining to a particular topic or all documents having a particular word or phrase. Such a content indexing scheme would require that information be examined and various content keys be stored. It may be possible, in some implementations, to store the content keys as an attribute of one or more files. Then, even if the data of the file is stored remotely, the content keys may be kept locally. In such a situation, when a user requests a listing of all files containing a certain content key, this request may be filled simply by reading information from local storage 64 if the content keys are kept locally. In such a situation, remote storage processing block 48 would simply examine appropriate information on local storage 64 and generate an appropriate response, such as that illustrated by response 68.

If, however, a user wishes to access information that is stored remotely, then such information needs to be retrieved from remote storage 54. In such a situation, remote storage processing block 48 may initiate steps to retrieve the required information. This is illustrated in FIG. 3 by attribute recall 70. In FIG. 3, attribute recall 70 is shown as being processed by read/write data processing block 52. If remote storage 54 is accessible by read/write data processing block 52 without operator intervention, then read/write data processing block 52 may simply retrieve the requested attributes from remote storage 54 and return them to remote storage processing block 48, as illustrated by remotely stored attributes 72. If, however, operator intervention is required, then perhaps read/write data processing block 52, or another processing block, may need to alert an operator to load or otherwise make accessible the appropriate remote storage medium needed to retrieve the required information. Then, once the appropriate medium is available, the required information can be retrieved and returned to remote storage processing block 48. In either case, an appropriate response, as for example response 68, can be returned.

Figure 4:
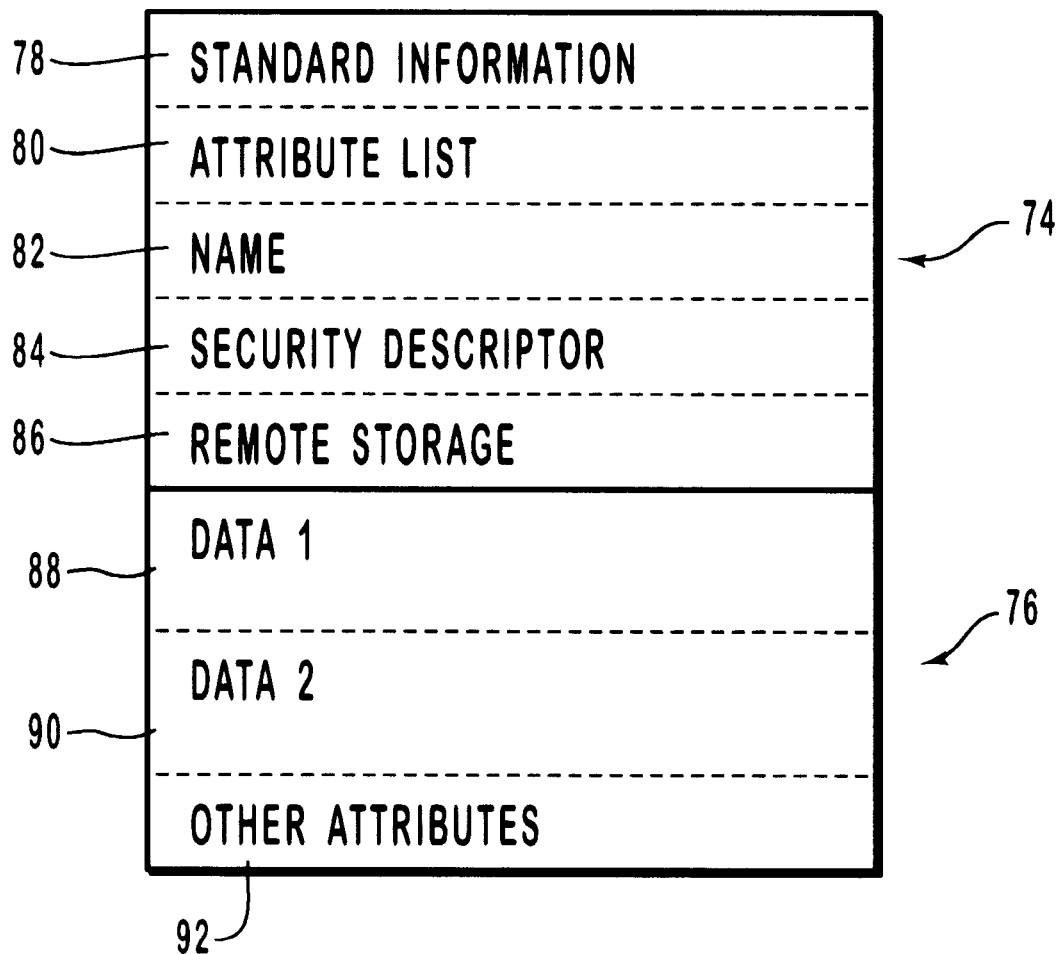
FIG. 4 is a diagram illustrating the attributes of a file suitable for use with the present invention.

Referring next to FIG. 4, a pictorial diagram of attributes of a file suitable for use with the present invention is illustrated. These attributes represent a modified list of attributes used by the NTFS file system developed specifically for Microsoft Windows NT®. The NTFS file system is described in greater detail in *Inside the Windows NT File System*, by Helen Custer, published by Microsoft Press and incorporated herein by reference. In FIG. 4, the attributes that make up a file may be divided into two fundamental groups. The first group contains system attributes and the second group contains user attributes. In general, system attributes are used to store information needed or required by the system to perform its various functions. Such system attributes generally allow a robust file system to be implemented. The exact number or type of system attributes is generally dependent wholly upon the particular operating system or particular file system utilized. User attributes, on the other hand, are used to store user controlled data. That is not to say that users may not gain access, under certain circumstances, to one or more system attributes. User attributes, however, define storage locations where a user or client program may store data of interest to the program. In FIG. 4, the system attributes are illustrated generally as 74 and the user attributes are illustrated generally as 76.

System attributes may comprise, for example, standard information attribute 78, attribute list 80, name attribute 82, security descriptor attribute 84, and remote storage attribute 86. Standard information attribute 78 represents the standard "MS-DOS" attributes such as read-only, read/write, hidden, and so forth. Attribute list 80 is an attribute used by NTFS to identify the locations of additional attributes that make up the file, should the file take up more than one storage record in the master file table. The master file table is the location where all resident attributes of a file or directory are stored. Name attribute 82 is the name of the file. A file may have multiple name attributes in NTFS, for example, a long name, a short MS-DOS name, and so forth. Security descriptor attribute 84 contains the data structure used by Windows NT® to specify who owns the file and who can access it. These attributes are described in greater detail in *Inside the Windows NT File System*, previously incorporated by reference.

Remote storage attribute 86 is a new attribute added by the present invention. Remote storage attribute 86 identifies a particular file as having remotely stored attributes. The remote storage attribute preferably contains sufficient information to allow the location of remotely stored attributes to be identified. All attributes, when taken as a whole, must also be able to identify which attributes of a particular file are stored remotely and which attributes are stored locally. Such information may be contained in remote storage attribute 86 or such information may be obtained by examining the other attributes of the file. For example, if each attribute is of a particular length, or if the length of a particular attribute is stored with the attribute, then it may be possible to identify which attributes are stored remotely simply by comparing the expected length with the length actually stored on local storage. If for example, a data attribute is expected to be 100K bytes long and the amount of information actually stored is substantially less, then it may be presumed that the data attribute is stored remotely. Alternatively, such information may simply be incorporated into remote storage attribute 86. In one embodiment, the remote storage attribute comprises:

| Remote Storage Flag | Tag | Data Length | Data |
| --- | --- | --- | --- |

As explained in greater detail below, certain embodiments of the present invention utilize a plurality of driver means for performing I/O processing in order to implement remote data storage processing. For example, remote storage processing block 48 of FIGS. 2 or 3 may be implemented in one driver means for performing I/O processing and read/write data processing block 62 may be implemented using another driver means for performing I/O processing. These two driver means could then coordinate in order to achieve the objectives of the present invention by passing information back and forth between them. In fact, a driver means for performing I/O processing that implements the remote storage processing functions may simply be one of a plurality of driver means used for various purposes in the I/O system. Such an embodiment is discussed hereafter. In these situations, it may be necessary to identify which driver means should assume responsibility for processing I/O requests involving files with remotely stored attributes. Embodiments within the scope of this invention may comprise means for identifying a particular driver means as the driver that should process at least part of an I/O request. Any mechanism which identifies a particular driver as the owner of the remote storage attribute can be used for such a means. If the remote storage attribute has the structure illustrated in the table above, such a means may comprise, for example, the tag value. In this example, the tag is a data word that contains the I.D. of the owner of the remote storage attribute. Such a mechanism allows a plurality of hierarchical storage managers to exist within a single system, each adapted to process I/O requests involving different types of files or different types of remote storage devices.

It is preferred that the tags be assigned in a manner so that the same tag is always associated with the same owner driver no matter which system the driver is installed on. In other words, it is preferred that some mechanism exist that assigns a tag value to a particular driver. For example, there may be a central repository or clearing house which assigns blocks of tag values to various driver manufacturers. The driver manufacturers can then assign tags to specific drivers. Any other mechanism that allows a tag value to be associated with at most a single driver can also be used. Assigning tag values in this way allows the same owner driver to process the same remote storage requests no matter which system it is installed on. Alternatively, in some situations it may be possible to assign local tag values in a dynamic way so that tag values are assigned by the system during installation. However, several problems may exist with such a method and it is not generally preferred.

In the remote storage attribute illustrated in the table above, an optional remote storage flag is illustrated. The remote storage flag is illustrated above to indicate that a mechanism must exist to allow identification of files that have remotely stored attributes. Such an indication may be given, for example, by using a remote storage flag which indicates a file having remotely stored attributes. Alternatively, other mechanisms may also be used. For example, a flag may be kept for each attribute that can be stored remotely. When an attribute is stored remotely, the flag can be set. Such a mechanism allows not only identification of the fact that remotely stored attributes exist, but also identification of which attributes are stored remotely. As yet another example, the expected length of each attribute may be compared to the actual amount of data stored locally. As yet another example, one or more of the tag values may be reserved to indicate that a file does not have any remotely stored attributes. Using such a mechanism it would be possible, for example, to reserve tag 0 to indicate that a file did not have any remotely stored attributes. Any other tag value would indicate that the file had at least one remotely stored attribute.

The remote storage attribute illustrated above allows storage of owner controlled data. Embodiments of this invention, therefore, comprise means for storing information used by driver means to manage remotely stored attributes. By way of example, and not limitation, such a means may comprise an owner controlled data field. The owner controlled data field represents a location where the owner of the remote storage attribute may place any type of data needed to properly manage the remotely stored attributes. For example, the location of remotely stored attributes may be stored in the data field of the remote storage attribute. Other examples have also been previously given. As yet another example, some hierarchical storage managers may store the identity of the remotely stored attributes in the owner controlled data field. This would also be a mechanism to allow a hierarchical storage manager to quickly identify which attributes were stored locally, and which attributes were stored remotely. Any other type of data may also be stored in this data field.

In the remote storage attribute illustrated above, the data field is preceded by a data length indicator. In this storage format, the length of the data field is stored in order to ascertain how much data must be read to complete the data field. Alternatively, in some embodiments it may be more efficient to store a data field of a fixed length or a data field that utilizes blocks of information chained together through pointers or links. Essentially, any mechanism that identifies how much data must be read to complete the data field can be utilized. Consideration should also be given to how much data may need to be stored by an owner driver. Such considerations will influence how the data field is stored and the maximum possible length of the data field.

Returning now to FIG. 4, consideration is given to group 76, which represents user attributes of a file. As previously explained, user attributes represent those attributes used by a user or other client process to store user or client process information. An NTFS file typically has one or more data attributes illustrated in FIG. 4 by data 1 attribute 88 and data 2 attribute 90. Most traditional file systems only support a single data attribute. A data attribute is basically much like a location where user controlled data can be stored. For example, the document of a word processing document is typically stored in the data attribute of a file. In the NTFS file system, a file can have multiple data attributes. One data attribute is referred to as the "unnamed" attribute while the other attributes are named attributes, each having an associated name. Each of the data attributes represents a storage location where different types of user controlled data may be stored. When combined with the present invention, such a file structure allows any or all of the data attributes to be stored either locally or remotely. This can represent a significant advantage over prior art systems. In prior art systems, the data in a file was either all stored locally or all stored remotely. There was no concept of storing a portion of the data locally and a portion of the data remotely. Using the multiple data attributes of the NTFS file system allows certain data to be stored locally while other data is stored remotely. Thus, if a file contained certain data that was accessed regularly and other data that was accessed only infrequently, the data that was accessed only infrequently could be moved to remote storage while the data that was accessed frequently could be maintained in local storage.

In addition to one or more data attributes, a file may also have other user defined attributes as illustrated by other attributes 92. Such attributes represent any other attributes that are user defined and that are stored with the file. Such user defined attributes may be created and used for any purpose desired by the user.

Although the above discussion has gone into some detail with regards to a particular type of file, such should be construed as exemplary only and not as limiting the scope of this invention. The present invention will work with any type of file or other entity that has a remote storage attribute added to the existing attributes of the file. In the alternative, it may also be possible to co-opt or utilize an existing system attribute to store the remote storage information and hence, equivalently, provide a way to include a remote storage attribute without increasing the existing number of system attributes in the file.

Figure 5:
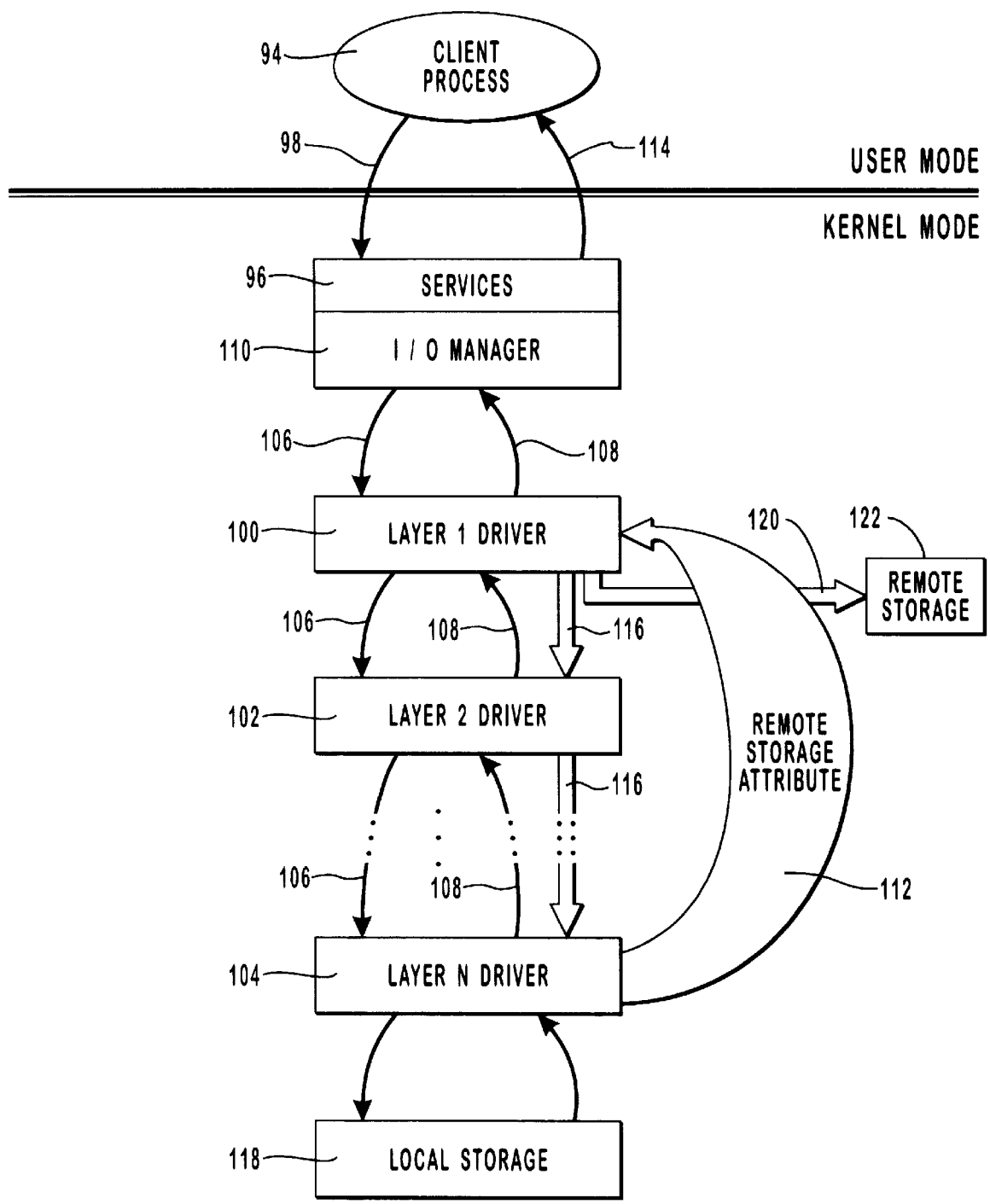
FIG. 5 is a diagram illustrating transfer of a control from one layered driver to another layered driver when a remote storage attribute is encountered.

Turning now to FIG. 5, the overall structure of one embodiment of the present invention is presented. FIG. 5 represents a top-level conceptual diagram illustrating an I/O system that utilizes a plurality of driver means for performing I/O processing. Client process 94 makes an I/O request that is eventually forwarded to operating system services 96 as illustrated by arrow 98. The I/O system illustrated in FIG. 5 comprises a plurality of driver means for performing I/O processing. By way of example, and not limitation, in FIG. 5 such driver means are illustrated by layer 1 driver 100, layer 2 driver 102, and layer N driver 104.

Because such I/O requests are passed between drivers, embodiments within the scope of this invention may comprise means for passing I/O requests from one driver means to another. By way of example, in FIG. 5 such means is illustrated by arrows 106 and 108 which illustrate I/O requests being passed directly from one driver to another. Such means may also comprise an I/O manager which handles the transferring of I/O requests from one driver to another. Such an I/O manager may be I/O manager 110 of FIG. 5.

In FIG. 5, I/O manager 110 forwards the I/O request received from client process 94 to layer 1 driver 100. Such an I/O request may be in the form of a function or service that is called by the I/O manager or any other mechanism which transfers the appropriate information to the appropriate driver. In Microsoft Windows NT®, for example, a message driven mechanism is used to communicate between the various drivers of the I/O system. In this system, an I/O request results in the I/O manager creating an I/O Request Packet (IRP) and sending the IRP to the appropriate driver. As the I/O requests are processed and forwarded to other drivers, information may be added to the IRP and the IRP passed to the next driver. In addition, a new IRP may be created and sent to the next driver. In certain circumstances, the IRP may be modified or "transmogrified" before being passed on to the next driver. In Microsoft Windows NT®, the I/O manager is responsible for transferring IRPs between drivers. In other systems, other mechanisms may be used. Such implementation details are considered to be design choices and are not critical to the invention.

Returning now to FIG. 5, the I/O request is forwarded through the various drivers as indicated by arrows 106, with each driver performing any required processing before forwarding the I/O request on to the next driver. Note that although FIG. 5 illustrates each driver receiving the I/O request in turn, in some embodiments it may be desirable to skip certain drivers so that only those drivers that are needed to process the I/O request actually handle the I/O request.

In one embodiment of the present invention, when a plurality of drivers are used to perform I/O processing, a mechanism exists for interrupting the normal sequence of processing when a file is encountered with a remote storage attribute. Control is then passed to another driver to decide how the I/O request should be processed. Embodiments within the scope of the present invention may therefore comprise means for interrupting processing of an I/O request. In FIG. 5, such means may be incorporated, for example, into layer N driver 104. In this embodiment of the invention, the normal sequence of processing is interrupted when a file is encountered that has remotely stored attributes. Such a file may be identified, for example, by the presence of a remote storage attribute or by examination of the remote storage attribute and/or other attributes as previously explained.

When a file with remotely stored attributes is recognized, the normal sequence of processing the I/O request is suspended and steps are taken to complete the processing of the I/O request. The steps involve transferring control for processing the I/O request to a different driver in order to allow the driver to participate in the processing of the I/O request for the file with remotely stored attributes. Embodiments within the scope of this invention may thus comprise means for transferring control for processing an I/O request from one driver to another. Any mechanism which transfers control from a driver processing the I/O request to another driver, when processing of the I/O request is interrupted prematurely, may be utilized. In FIG. 5, such a mechanism is illustrated, for example, by arrow 112, which shows control for processing the I/O request being transferred from layer N driver 104 to layer 1 driver 100 when a file with remotely stored attributes is encountered during the processing of an I/O request. As explained in greater detail below, the mechanism for transferring control from one driver to another may require transferring certain information so that the driver assuming control can properly process the I/O request. Thus, embodiments within the scope of this invention may also comprise means for passing remote storage information to a driver.

Once control is transferred from layer N driver 104 to layer 1 driver 100, layer 1 driver 100 must then properly process the I/O request. In certain situations and embodiments, the driver assuming control may be able to completely process the I/O request, either with the information supplied when control was transferred or by obtaining additional information from local storage. If the driver can process the I/O request without retrieving additional information, then the result may be returned to the client process as indicated by arrows 108 and 114.

If the I/O request cannot be completely processed without retrieval of additional information, either from local storage or from remote storage, then the driver may need to create one or more additional I/O requests in order to retrieve the appropriate information. Embodiments within the scope of this invention may therefore comprise means for creating a second I/O request. In FIG. 5, such means for creating is illustrated by arrows 116 which may represent an I/O request sent back through the drivers to obtain information from local storage 118 or arrow 120, which indicates a request sent to retrieve information from remote storage 122.

In order to create a second I/O request, whatever mechanism is necessary to retrieve the desired information can be utilized. For example in Microsoft Windows NT®, such a means may be implemented by creating a new IRP or transmogrifying an existing IRP and passing the IRP to the appropriate driver. As discussed in greater detail below, when retrieving information from local or remote storage, processing may also be required by other computer systems. Thus, such means for creating a second I/O request may also transfer I/O requests to other computers. In either case, however, once the appropriate information is retrieved, then an appropriate response can be sent back to client process 94 as indicated by arrows 108 and 114.

In summary, certain embodiments of the present invention provide a system and method that interrupts the normal sequence of processing of an I/O request in order to allow a driver responsible for hierarchical storage management to intervene and participate in the processing of an I/O request involving a file or other entity with remotely stored attributes. It should be apparent that although FIG. 5 illustrates a plurality of layered drivers, the functionality of the plurality of drivers may be incorporated into one or more monolithic drivers. In such a system, the need for interdriver communication would be reduced. However, various advantages of an I/O system with layered drivers would be unavailable. The choice to implement the present invention either in a plurality of layered drivers or in one or more monolithic drivers incorporating the functionality of several layered drivers is considered to be a design choice and not critical to the invention. It is preferred, however, that the various functional elements cooperate in essentially the manner illustrated. In other words, when a file with one or more remotely stored attributes is encountered, control is turned over to a processing block with responsibility for processing I/O requests involving such files. Appropriate functionality has been previously described.

Figure 6:
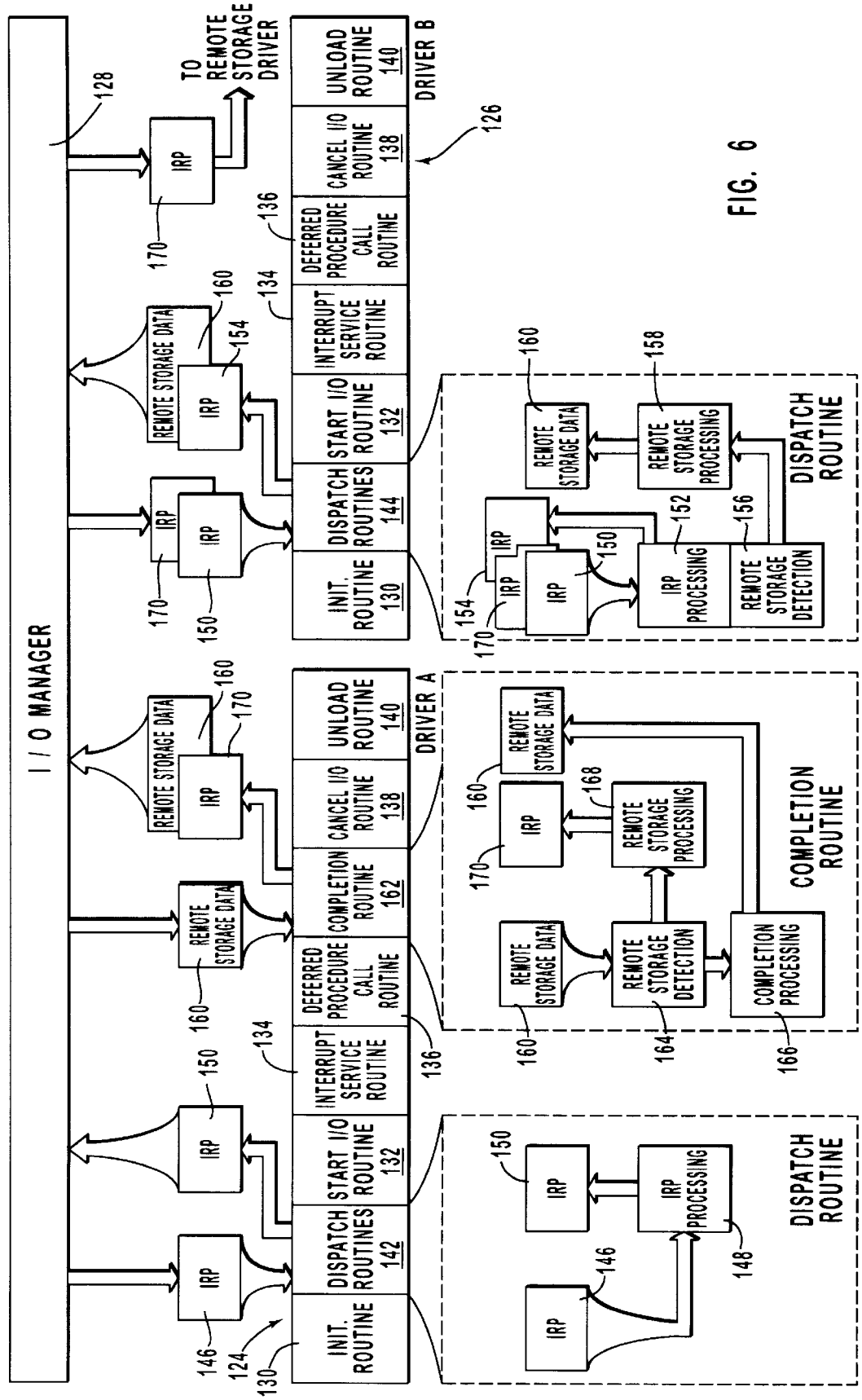
FIG. 6 is a diagram illustrating the services provided by two layered drivers and showing the general functionality incorporated into the drivers by the present invention.

Turning now to FIG. 6, a more detailed diagram of an I/O system comprising a plurality of driver means for performing I/O processing is presented. The I/O system in FIG. 6 may be an I/O system such as that utilized by Microsoft Windows NT®. Other operating systems that use a plurality of driver means for processing I/O requests may also have similar structures. Similarly, the concepts discussed in conjunction with FIG. 6 may be implemented using any I/O system that uses a plurality of drivers or a single monolithic driver by incorporating or combining the appropriate functionality into the appropriate drivers. Use of the structures illustrated in FIG. 6 should not, therefore, be considered limiting of the present invention and should in all respects be considered as only one possible implementation.

The embodiment illustrated in FIG. 6 comprises a plurality of driver means for performing I/O processing. As previously explained, I/O processing and the term I/O requests are intended to be construed broadly and include any function or operation that may be performed by the I/O system. By way of example, and not limitation, in FIG. 6 such driver means are illustrated by driver A, shown generally as 124, and driver B, shown generally as 126. Embodiments within the scope of this invention may also comprise means for passing I/O requests from one driver means to another. By way of example, in FIG. 6 such means is illustrated by I/O manager 128. I/O manager 128 is representative, for example, of an I/O manager that is responsible for transferring I/O requests among the plurality of drivers used by an I/O system. As previously discussed, some embodiments may not utilize an I/O manager and may rely on direct communication between the various drivers. In such embodiments, the means for passing an I/O processing request from one driver to another would be the mechanism used by one driver to pass I/O requests directly to the other driver. In still other embodiments where the functionality of one or more drivers are incorporated into a monolithic driver, a means for passing I/O requests from one driver to another may not be necessary or may simply reside internally within the monolithic driver itself.

As illustrated in FIG. 6, driver A 124 and driver B 126 provide a set of services or routines that can be accessed by I/O manager 128 to accomplish various functions. The routines illustrated in FIG. 6 represent a portion of the possible routines that a driver operating under Microsoft Windows NT®may have. Details regarding the various routines can be found in chapter 8 of *Inside Windows NT*, by Helen Custer, published by Microsoft Press, the entirety of which is incorporated herein by reference.

Certain routines perform a similar function for both driver A 124 and driver B 126. Although the exact details of the routines may be very different, the overall goal of the routines is the same. Routines that perform a similar function for both driver A 124 and driver B 126 include: initialization routine 130; start I/O routine 132; interrupt service routine 134; deferred procedure call routine 136; cancel I/O routine 138; and unload routine 140. Although these routines are important to the operation of a driver under an operating system such as Microsoft Windows NT®, they are not generally important for purposes of this invention. However, the function of these routines are briefly summarized below.

Both driver A 124 and driver B 126 have an initialization routine 130. Although the initialization routines may be different for each driver, the initialization routine is executed by the I/O manager when the I/O manager loads the driver into the operating system. The routine performs whatever initialization is needed to allow the I/O manager to use and access the driver. Start I/O routine 132 is used to initiate a data transfer to or from a device. Interrupt service routine 134 is called when a device sends an interrupt for a particular driver. Under Windows NT®, processing in an interrupt service routine is kept to an absolute minimum in order to avoid blocking lower level interrupts unnecessarily. Deferred procedure call routine 136 performs most of the processing involved in handling a device interrupt after the interrupt service routine executes. Cancel I/O routine 138 is called when an I/O operation is to be cancelled. Unload routine 140 releases system resources so that the I/O manager can remove the driver from memory.

Drivers under Microsoft Windows NT® include a set of dispatch routines, such as dispatch routines 142 of driver A 124 and dispatch routines 144 of driver B 126. Dispatch routines are the main functions that a device driver provides. Some examples are read or write functions and any other capabilities of the device, file system, or network the driver supports. If driver A 124 is used to implement remote storage capability, then dispatch routines 142 would include routines that expose the appropriate functionality. When an I/O operation is processed by a driver, I/O manager 128 generates an I/O Request Packet (IRP) and calls a driver through one of the driver's dispatch routines. Thus, an I/O request may be represented in FIG. 6 by IRPs passed among drivers or between the I/O manager and a driver.

When multiple drivers cooperate to perform various functions, one driver may perform partial processing of an I/O request before passing the I/O request to a subsequent driver. Such processing is illustrated in FIG. 6 by IRP 146 passed to driver A 124, partially processed by driver A 124 as indicated by IRP processing block 148, and passed to driver B 126 through IRP 150. Note that IRP 146 and IRP 150 may be the same IRP. However, for clarity in identifying how IRPs may flow between drivers, they are numbered separately in FIG. 6. It may also be possible to have an embodiment which creates a new IRP so that IRP 146 and IRP 150 are different.

When an I/O request does not involve a file or other entity with remotely stored attributes, a driver processes the I/O request in a normal manner and returns the information associated with the I/O request in the normal manner. Thus, systems which have one or more hierarchical storage managers installed will suffer little or no processing overhead from the hierarchical storage managers until an I/O request involving a file with remotely stored attributes is encountered. In FIG. 6, for example, when IRP 150 is received by driver B 126, it can be processed in the normal manner by IRP processing block 152. The results of the processing may be returned in IRP 154. Although not illustrated in FIG. 6, IRP 154 will be passed back to driver A 124 after processing by driver B 126. This is all part of the normal I/O processing and is explained in greater detail in *Inside Windows NT*, previously incorporated by reference.

As previously explained in conjunction with FIG. 5, in embodiments which utilize a plurality of driver means to implement the functionality of the present invention, when an I/O request involving a file with remotely stored attributes is encountered, the normal processing of the I/O request is interrupted and control is transferred to a driver specifically adapted to handle I/O requests involving files with remotely stored attributes. In order to accomplish this process, embodiments within the scope of this invention comprise means for interrupting processing of an I/O request. Such means may be any mechanism by which a driver recognizes that an I/O request involves a file with remotely stored attributes and prematurely terminates the processing of the I/O request so that control may be transferred to another driver. In FIG. 6, such means is illustrated, for example, by remote storage detection block 156.

Detecting a file with remotely stored attributes may be implemented in a variety of ways. Most of these have been discussed previously in conjunction with one possible implementation of a remote storage attribute. Depending on the exact contents of the remote storage attribute and the particular implementation, it may be possible to identify a file with remotely stored attributes simply by examining the contents of the remote storage attribute. As previously discussed, such a remote storage attribute may comprise a flag or other means to identify when the remote storage attribute contains information regarding remotely stored attributes. Alternatively, it may be possible to identify files with remotely stored attributes simply by examining information in the file itself. For example, it may be possible to identify files with remotely stored attributes by comparing an expected length of one or more attributes with the actual length of the attributes stored on local storage. As yet a third alternative, identifying files with remotely stored attributes may be accomplished in certain embodiments by examining both information stored in the remote storage attribute and other information stored in the file. Once the exact implementation of the remote storage attribute and the file structure are identified, the various options available to detect files with remotely stored attributes will be apparent.

When remote storage detection block 156 identifies that an I/O request involves a file with remotely stored attributes, normal processing of the I/O request is terminated and steps are undertaken to transfer responsibility for processing the I/O request to another driver. In FIG. 6, these steps are performed by remote storage processing block 158.

Remote storage processing block 158 performs any preprocessing necessary to transfer control from the current driver to the driver that will assume responsibility for processing the I/O request. If, for example, the remote storage attribute contains a tag and a data field as previously discussed, then remote storage processing block 158 may extract the tag and data field from the remote storage attribute and prepare them for transfer to the owner of the remote storage attribute. Thus, embodiments within the scope of this invention may comprise means for passing remote storage information to a driver. By way of example, and not limitation, in FIG. 6 such means is illustrated by remote storage data 160. Remote storage data 160 simply represents the remote storage information extracted by remote storage processing block 158. In some embodiments it may be possible to extract the remote storage information from the remote storage attribute and pass it directly to the owner of the remote storage attribute rather than passing it through I/O manager 128 as illustrated in FIG. 6. Essentially, any mechanism that allows the owner of the remote storage information to access the information stored in the remote storage attribute can be utilized as a means for passing remote storage information to a driver. This includes passing a pointer to a location where the remote storage information is stored or to the remote storage attribute itself. In one embodiment, remote storage data 160 is included in an IRP and passed to another driver.

When an I/O request involving a file with remotely stored attributes is identified, responsibility for processing the I/O request is transferred from one driver to another. Embodiments within the scope of this invention therefore comprise means for transferring control for processing an I/O request from one driver to another. In the embodiment illustrated in FIG. 6, such means may comprise, for example, completion routine 162. Drivers written for the Windows NT® operating system may comprise one or more completion routines which are called by the I/O manager after a lower level driver finishes processing an IRP. For example, in an embodiment with a file system driver and a device driver, the I/O manager may call a file system driver completion routine after the device driver finishes transferring data to or from a file. The completion routine may notify the file system driver about the operation's success, failure, or cancellation, and allow the file system to perform cleanup operations. Thus, during normal processing, if driver B 126 receives IRP 150, completely processes it, and returns IRP 154, I/O manager 128 may call a completion routine in block 162, which will notify driver A 124 of the success or failure of the I/O operation and allow driver A 124 to perform any cleanup processing.

Because I/O manager 128 calls a completion routine when a lower level driver has completed its processing, such a completion routine makes an ideal location to place a mechanism to detect transfer of control for processing an I/O request involving a file with remotely stored attributes. Thus, completion routine 162 may examine remote storage data 160 in order to identify whether driver A 124 is the owner of the remote storage attribute and should assume processing responsibilities for the I/O request.

Before a driver assumes responsibility for processing an I/O request involving a file with remotely stored attributes, however, the driver must ascertain whether it is the owner of the remote storage attribute. It should be apparent by now that a plurality of hierarchical storage managers or other specialized drivers may be incorporated within a particular system. Each of the drivers may then be adapted for performing some type of specialized processing. Using a remote storage attribute like that described previously, each of the drivers would be assigned a unique tag value. When a lower level driver encountered a file with a remote storage attribute, the lower level driver would extract the tag and value of the remote storage attribute and pass it back up to the higher level drivers. Each of the higher level drivers could then examine the tag value to identify if it was the owner of the remote storage attribute and should assume responsibility for processing the I/O request. In this manner, different drivers storage managers could exist and cooperate within a particular system in order to achieve hierarchical management of storage. A generalized mechanism employing these principles, that can be used either for remote storage or for other types of specialized processing, is disclosed in copending U.S. Application Ser. No. 08/862,025, entitled "FILE SYSTEM PRIMITIVE ALLOWING REPROCESSING OF I/O REQUESTS BY MULTIPLE DRIVERS IN A LAYERED DRIVER I/O SYSTEM," (hereinafter the "Reparse Points" application) incorporated herein by reference.

In a multi-layered environment, embodiments within the scope of this invention may comprise means for identifying whether remote storage information received by a particular driver is owned by that driver. By way of example, and not limitation, in FIG. 6, such means is illustrated by remote storage detection block 164. Remote storage detection block 164 examines remote storage data 160 to identify whether driver A 124 is the owner of the remote storage information. If driver A 124 is not the owner of the remote storage information, driver A 124 may perform any normal completion processing that is necessary as indicated by completion processing block 166, and pass remote storage data 160 on to I/O manager 128 for transfer to another driver.

If, on the other hand, remote storage detection block 164 identifies driver A 124 as the owner of the remote storage information, control passes to remote storage processing block 168 for further processing of the I/O request. Beyond assuming control for processing the I/O request, what happens when a driver identifies itself as the owner of the remote storage information is undefined by the invention. However, in general the driver will assume responsibility for processing the I/O request and take steps to further completion of the I/O request. For example, remote storage processing block 168 may perform any of the functions previously described in conjunction with FIGS. 2 or 3 to further completion of the I/O request. This includes situations where remote storage processing block 168 may be able to completely finish processing the I/O request using the information received in remote storage data 160. In such a situation, after the driver has finished processing the I/O request, the normal completion procedure is followed. In the case of Microsoft Windows NT®, this will include passing any necessary information in an IRP back to the I/O manager for further transfer. It may also include calling the completion routine of any higher level drivers in order to allow them to perform any necessary cleanup processing or in order to inform them of the status of the I/O request.

In some situations, the driver that is the owner of the remote storage information may not be able to completely process the remainder of the I/O request by itself. In such a situation, remote storage processing block 168 may generate an IRP that is passed to other drivers to further the processing of the I/O requests. Alternatively, an I/O request can be generated and passed to another computer for further processing as discussed in conjunction with FIG. 8 below. Embodiments within the scope of this invention may therefore comprise means for creating a second I/O request to continue processing of the original I/O request. Any mechanism which is utilized by the particular embodiment to enlist the help of other drivers or systems to complete the I/O request may be utilized for such means. For example, in FIG. 6, the means for creating a second I/O request is illustrated by remote storage processing block 168 and IRP 170. IRP 170 may then be passed to another driver, as for example, driver B 126 or to a remote storage driver as indicated in FIG. 6. The driver receiving IRP 170 would then process it as any other IRP. For example, IRP 170 may be sent to driver B 126 in order to retrieve more information from local storage that is needed to completely process the original I/O request. Alternatively, IRP 170 may be a mechanism whereby a recall request for a remotely stored attribute is issued. Thus, IRP 170 may be passed to a remote storage driver or other device which initiates and recalls required information from remote storage.

When remote storage processing block 168 creates IRP 170, it may create the IRP from scratch or may take an existing IRP and "transmogrify" the IRP. The process of transmogrification takes an existing IRP and changes information in the IRP to create a modified or new IRP. Means for creating a second I/O request may be implemented differently in different systems. For example, in a system where one driver directly calls another driver, the means for creating a second I/O request may be a mechanism whereby information is assembled and passed to another driver through the direct calling mechanism. Essentially, all that is required to implement means for creating a second I/O request is to have the ability to create or modify an I/O request that is then passed to another driver or entity for further processing.

Figure 7:
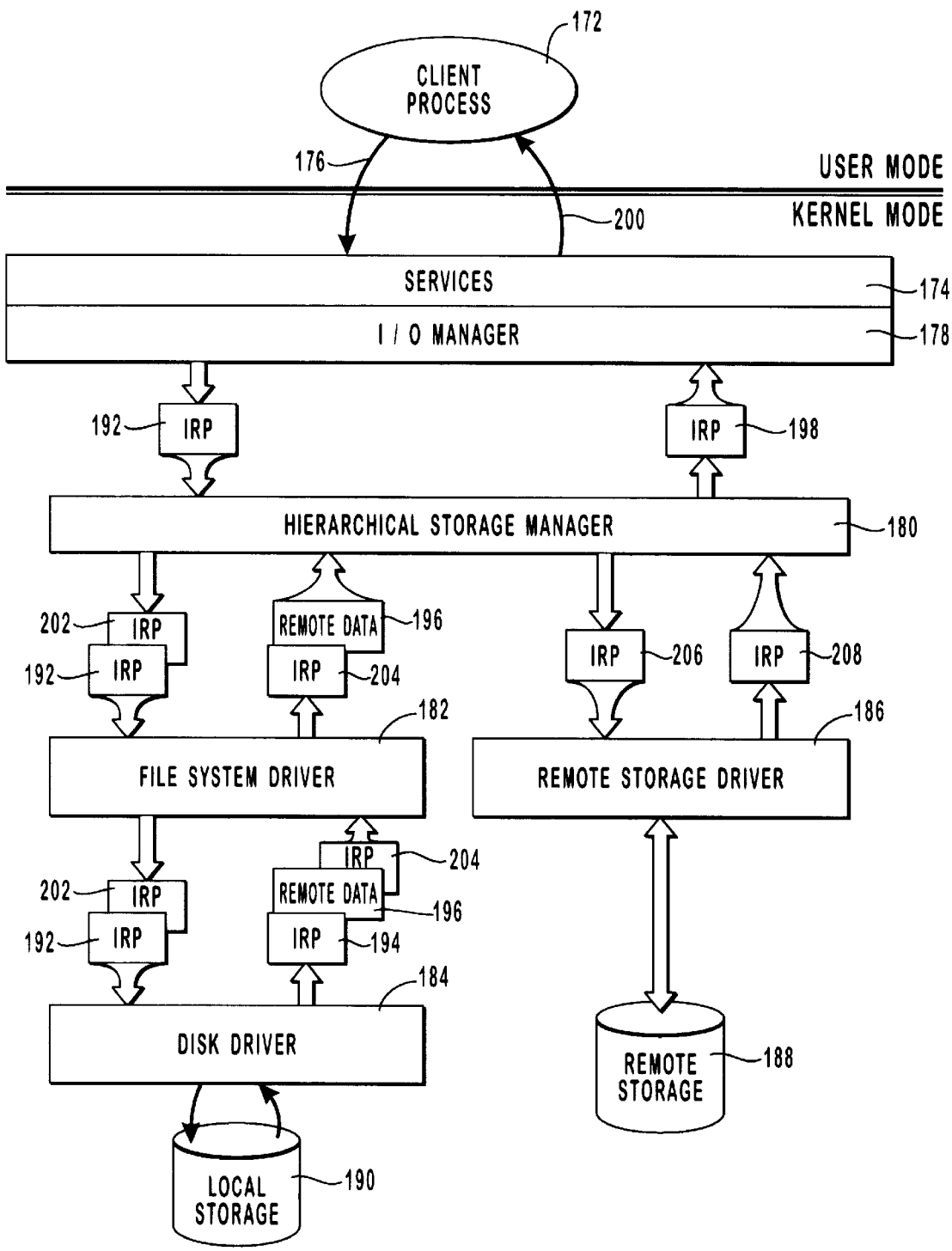
FIG. 7 is an example illustrating how the present invention may be utilized to process an I/O request involving remotely stored data.

Reference is now made to FIG. 7, which is used to present a specific example in order to clarify how multiple drivers can cooperate to implement hierarchical management of storage. In FIG. 7, client process 172 makes an I/O request to an I/O system comprising a plurality of driver means for performing I/O processing. Client process 172 makes a call to operating system services 174 as indicated by arrow 176. I/O manager 178 receives the I/O request and coordinates the transfer of the I/O request among the various driver means of the I/O system.

In FIG. 7, a plurality of driver means for performing I/O processing are illustrated. Such driver means comprise hierarchical storage manager 180, file system driver 182, disk driver 184, and remote storage driver 186. Hierarchical storage manager 180 is responsible for managing remotely stored attributes of files or other entities. Hierarchical storage manager 180 removes attributes from files or other entities that are accessed infrequently and stores them in a remote location, such as remote storage 188. Hierarchical storage manager 180 also coordinates recall of appropriate attributes when necessary. In essence, hierarchical storage manager 180 incorporates the high level functionality discussed in conjunction in FIGS. 2 and 3 above. File system driver 182 is responsible for translating a request for access to a file or directory to a physical location on local storage 190. Disk driver 184 is responsible for retrieving information from or placing information on local storage 190. Remote storage driver 186 is responsible for coordinating and managing transfer of information to and from remote storage 188. It should be noted that remote storage driver 186 may operate through many intermediate drivers or systems in order to store information on or retrieve information from remote storage 188. The I/O system of FIG. 7 thus uses a plurality of drivers, each responsible for a specific function or group of functions, to provide a robust I/O environment.

When client process 172 makes an I/O request as indicated by arrow 176, I/O manager 178 creates IRP 192 and coordinates transfer of IRP 192 among the various drivers in the I/O system. In this example, IRP 192 is passed through each succeeding driver, with each driver performing any necessary preprocessing in order to enable the functions of the lower level driver, until it reaches disk driver 184. Disk driver 184 then retrieves the desired information from local storage 190 and returns such information via IRP 194 to file system driver 182 If the I/O request involved a file with remotely stored attributes, file system driver 182 would recognize this when information was returned in IRP 194. The various mechanisms previously discussed may be used by file system driver 182 in order to detect whether the particular I/O operation involved a file having a remotely stored attributes. In FIG. 7, this is specifically illustrated by the return of remote storage data 196 to file system driver 182 Remember, however, that remote storage data 196 may be returned in an IRP, as for example, IRP 194. Similarly, IRP 194 may be the same IRP as IRP 192, depending on the particular implementation.

When file system driver 182 recognizes that an I/O operation involves a file with remotely stored attributes, file system driver 182 will, at a minimum, extract the information in the remote storage attribute and pass the information to higher level drivers so that one may identify itself as the owner of the remote storage attribute and assume responsibility for processing the I/O request. In FIG. 7, this is illustrated by file system driver 182 passing remote storage data 196 to hierarchical storage manager 180. This may be accomplished by the I/O manager calling into the completion routine of hierarchical storage manager 180 as previously described in conjunction with FIG. 6. Other mechanisms may also be used as appropriate.

When hierarchical storage manager 180 receives remote storage data 196, hierarchical storage manager 180 will examine the information in the remote storage attribute to identify whether it owns the remote storage attribute and should assume control for processing the I/O request. In this example, hierarchical storage manager 180 would identify itself as the owner of the remote storage attribute and assume responsibility for processing the I/O request.

Once hierarchical storage manager 180 identifies itself as the owner and assumes responsibility for processing the I/O request, hierarchical storage manager 180 then identifies what should be done to further the processing of the I/O request. In general, one of three potential scenarios can be envisioned. Hierarchical storage manager 180 may be able to completely process the I/O request simply by using the information passed from file system driver 182 to hierarchical storage manager 180. Remember that such information may include not only the information in the remote storage attribute, but may also include other information from other attributes. The exact information passed from file system driver 182 to hierarchical storage manager 180 will depend upon the particular implementation. If hierarchical storage manager 180 can completely process the I/O request with the information it has, it may then return an appropriate result to client process 182 via IRP 198 and arrow 200.

If, however, hierarchical storage manager 180 cannot completely process the I/O request using only the information available to it, hierarchical storage manager 180 may take steps to retrieve the information it needs to process the I/O request. Depending upon the I/O request and the exact circumstances, the required information may need to be retrieved either from local storage, or from remote storage, or from both. Retrieval from local storage 190 is illustrated in FIG. 7 by IRP 202 which is passed to file system driver 182 and disk driver 184 and IRP 204 which is used to return the requested information. Retrieval from remote storage 188 is illustrated in FIG. 7 by IRP 206 which is transferred to remote storage driver 186 in order to initiate transfer of information to or from remote storage 188 as necessary and IRP 208 which returns any appropriate information to hierarchical storage manager 180. After hierarchical storage manager 180 retrieves appropriate information from either local storage 190 or remote storage 188 or both, hierarchical storage manager 180 can then complete processing of the I/O request and return an appropriate response via IRP 198 and arrow 200 as illustrated. The same scenario would be used, in slightly modified form, if information needed to be written to local storage 190 or remote storage 188 to complete the I/O request.

Figure 8:
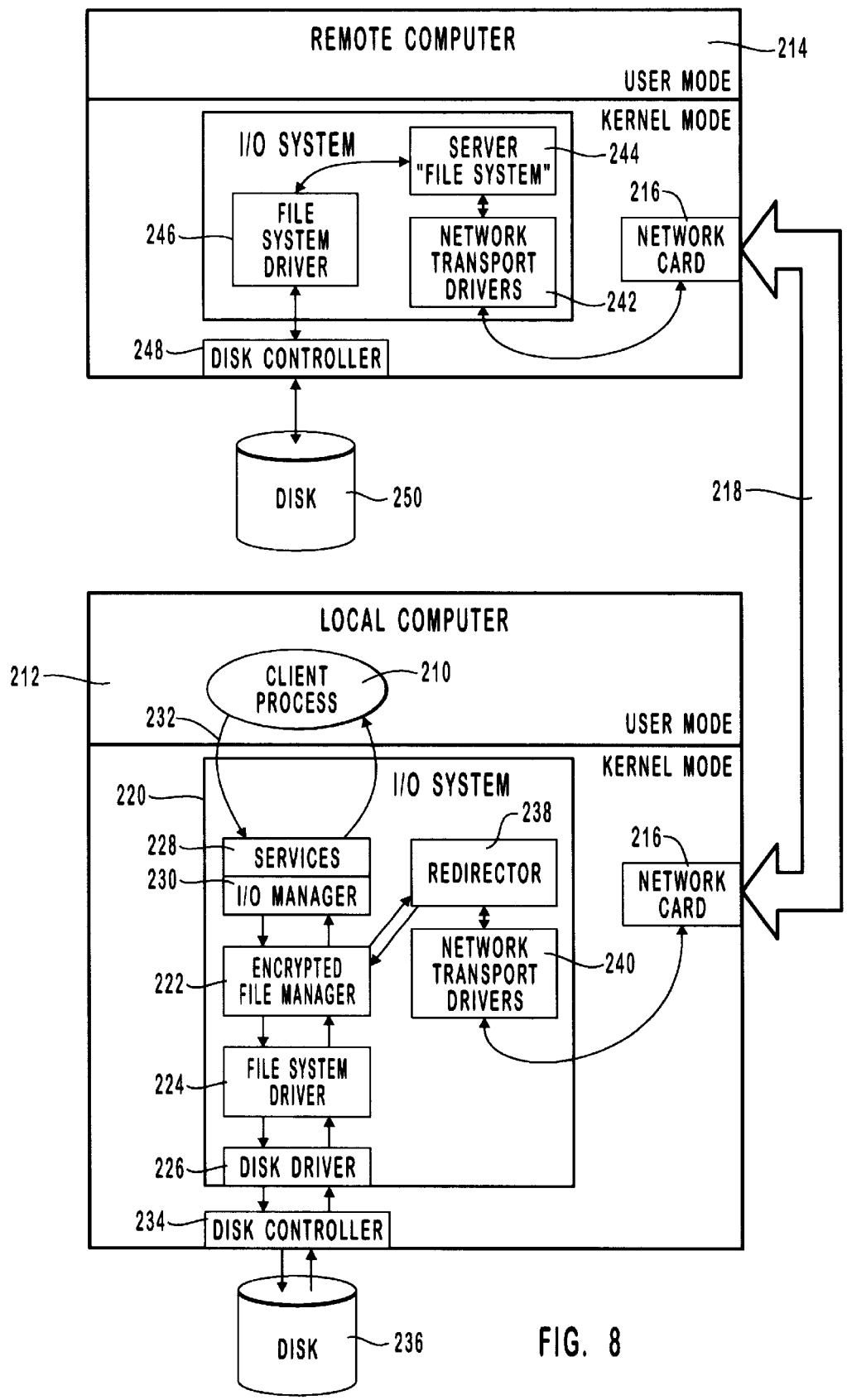
FIG. 8 is a diagram illustrating an example where another computer is used to complete an I/O request.

Referring next to FIG. 8, an example is presented where a particular type of hierarchical storage manager utilizes a separate computing system for processing I/O requests when a file with remotely stored attributes is encountered. In the embodiment illustrated in FIG. 8, client process 210 is executing on local computer 212. Local computer 212 is connected to remote computer 214 via network means for interconnecting computers. In FIG. 8, such network means is illustrated by network cards 216 and connection 218. I/O system 220, of local computer 212, comprises a plurality of driver means for performing I/O processing. In FIG. 8, such driver means is illustrated, for example, by encrypted file manager 222, file system driver 224, and disk driver 226. I/O system 220 also comprises operating system services 228 and I/O manager 230. As in FIG. 7, client process 210 makes calls to operating system services 228. I/O manager 230 receives I/O requests and coordinates the transfer of I/O requests among the various driver means of the I/O system. Alternatively, the various driver means of the I/O system may communicate directly with each other without using an I/O manager or other device to coordinate transfer of information.

In this system, certain attributes of files are encrypted and sent to remote computer 214 where they are stored in a secure environment with limited access. Thus, any I/O requests involving files which are encrypted and stored on remote computer 214 must be processed differently from other files that are not encrypted and stored locally. In this example, client process 210 is presumed to make an I/O request that involves an encrypted file stored on remote computer 214. Such a request is made, for example, by client process 210 calling operating system services 228 as indicated by arrow 232. The I/O request would be passed to file system driver 224, which would utilize disk driver 226 to retrieve the appropriate information. Disk driver 226 will utilize disk controller 234 to retrieve information from local storage 236. When an attempt to access an encrypted file was made, file system driver 224 would realize that the file had remotely stored attributes. The information in the remote storage attribute would then be passed to encrypted file manager 222, which would identify the encrypted file as being stored on remote computer 214. Encrypted file manager 222 would then undertake steps to retrieve the appropriate file.

The steps to retrieve the appropriate file may involve sending an I/O request to remote computer 214. Any mechanism which transfers an I/O request from encrypted file manager 222 to remote computer 214 may be utilized. In FIG. 8, such an I/O request may be sent via redirector 238 and network transport drivers 240. Redirector 238 provides the facilities necessary for local computer 212 to access the resources on other machines through a network. Network transport drivers 240 provide the mechanism for transferring information from local computer 212 to remote computer 214 via network cards 216 and connection 218. Other mechanisms may also be used and the components illustrated in FIG. 8 should be considered exemplary in all respects. Such mechanisms may generally included any type of connection between two computers such as a dedicated link, a Local Area Network (LAN), Wide Area Network (WAN), phone lines, wireless connections, and so forth. To support these communication mechanisms, various types of software drivers or components may be needed.

A request from encrypted file manager 222 would be sent to redirector 238, which uses network transport drivers 240 to transfer the I/O request via network card 216 and connection 218 to remote computer 214. In this particular example, the I/O request would be to retrieve attributes that have been encrypted and stored on remote computer 214. Such an I/O request would be received by remote computer 214 via network card 216, network transport drivers 242, and server file system 244. Server file system 244 communicates with redirector 238 in order to process and fill any I/O requests sent to remote computer 214. In order to fill an I/O request retrieving encrypted attributes, server file system 244 may utilize drivers and hardware of remote computer 214 such as file system driver 246 and disk controller 248. In the present example, server file system 244 will utilize file system driver 246 to retrieve the appropriate encrypted attributes from disk 250. The encrypted attributes would then be returned to encrypted file manager 222. When encrypted file manager 222 receives the encrypted attributes, encrypted file manager 222 may take steps to decrypt the information and then return that information to client process 210.

The examples given in FIGS. 5–8 have described embodiments where hierarchical management of storage is implemented using a plurality of different drivers in a layered driver model. When such a layered driver model is used to implement the present invention, these steps needed to create a hierarchical storage manager may be summarized as indicated below.

The first step is to define a tag that is to identify the specific hierarchical storage manager. As previously described, this tag needs to be different from all the existing tags on a given system. The copending Reparse Points patent application, previously incorporated by reference, explains how a general mechanism similar to the mechanism disclosed in this application can be used by any type of specialized driver (including a hierarchical storage manager) to intervene in the processing of an I/O request. The mechanism described therein also used an attribute with a tag value. In such a system, multiple drivers may exist and so the tag assigned to the hierarchical storage manager must be different from any other existing tags in the system. As previously explained, the tags may be pre-associated using some centralized allocation mechanism or may be allocated dynamically during installation time.

The next step is to design the information describing remote storage that is to be placed in the remote storage attribute and used by the hierarchical storage manager. Such information should enable the complete identification of data in remote storage. As previously explained, this data is private to each hierarchical storage manager present in the system and so can contain any information or have any format desired by the hierarchical storage manager. For hierarchical storage managers that distrust the operating environment, the remote storage attribute may include appropriate signatures to enable the hierarchical storage manager to recognize whether there has been any alteration of the data while it has been kept in local or remote storage.

The next step is to build a layered hierarchical storage manager to handle the data that will be stored in the remote storage attribute and to process I/O requests involving files with remotely stored attributes. Once the layered hierarchical storage manager is created and installed in the system, the hierarchical storage manager will process I/O requests involving files with remotely stored attributes as previously discussed in conjunction with FIGS. 5–8. As previously discussed, when processing the I/O request, the hierarchical storage manager has access to the information that came in with the original I/O request so that it can decide what action is to be taken to process the I/O request. Some actions may be resolved without access to additional information while some actions may require reading information from or writing information to local storage, while still other actions require reading information from or writing information to remote storage.

Although the examples given in FIGS. 5–8 have emphasized embodiments where hierarchical management of storage is implemented using a plurality of different drivers, it should be apparent that the functionality of any these drivers may be combined in order to achieve more monolithic drivers with a greater degree of functionality. Such matters are considered to be design choices and are not critical to the implementation of the present invention. The present invention involves a tight integration of hierarchical storage management into an existing I/O system. One goal of the present invention is to provide native support in the I/O system for remote storage of various attributes. This includes allowing the file system to detect and identify files with remotely stored attributes. The invention described herein is flexible enough to allow any or all of the attributes of a file or other entity to be stored either locally or remotely. All that needs to remain on local storage is sufficient information to allow the hierarchical storage manager to identify where the remotely stored attributes are located. The result is an I/O system that allows the state of remotely stored information to be tracked and kept as an integral part of the file system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for implementing remote file storage as an integral part of an I/O system having access to both local and remote storage mediums, said I/O system having a plurality of layered drivers and processing I/O requests involving files comprising a plurality of attributes, a first portion of which are adapted for storing user controlled data and a second portion of which are adapted for use by said I/O system, the method comprising:

identifying, with a particular one of the plurality of layered drivers, at least one attribute stored in either the first portion or the second portion of a file that should be stored remotely;

storing said at least one attribute in said remote storage medium; and storing, in the local storage medium and as part of the said second portion, a remote storage attribute that indicates to said I/O system that said at least one attribute has been stored in said remote storage medium, said remote storage attribute including:

a tag identifying said particular layered driver as a driver that can assume control of processing an I/O request involving said file; and information representing a location in said remote storage medium at which said at least one attribute is stored.

2. A method for implementing remote file storage as recited in claim 1 wherein said remote storage attribute further includes whatever information is desired by said particular layered driver, in addition to said information representing said location in said storage medium, in order to identify said at least one attribute.

3. A method for implementing remote file storage as an integral part of an I/O system as recited in claim 1 wherein said step of storing said at least one attribute is performed by said particular layered driver.

4. A method for implementing remote file storage as an integral part of an I/O system as recited in claim 1 further comprising the step of reading attributes of said file from local storage so that sufficient information is available to determine that said at least one attribute should be stored remotely.

5. A method for implementing remote file storage as an integral part of an I/O system as recited in claim 1 wherein said step of storing said at least one attribute is performed by said particular layered driver, and comprises at least the steps of (1) extracting information to be stored remotely and (2) sending said extracted information to another layered driver included in said plurality of layered drivers.

6. A method for implementing remote file storage as an integral part of an I/O system having access to both local and remote storage mediums, said I/O system having a plurality of layered drivers and processing I/O requests involving files comprising a plurality of attributes, a first portion of which are adapted for storing user controlled data and a second portion of which are adapted for use by said I/O system, the method comprising:

receiving an I/O request that requires access to a file, at least one attribute thereof being stored in said remote storage medium, the second portion of the plurality of attribute of said file including a remote storage attribute being stored on said local storage medium;

reading, from said local storage medium, said remote storage attribute in order to identify that said file has said at last one attribute stored in said remote storage medium, including the steps of:

reading a tag included in said remote storage attribute, said tag identifying a particular one of the plurality of layered drivers that can assume control of processing said I/O request; and reading information included in said remote storage attribute that represents a location in said remote storage medium at which said at least one attribute is stored;

determining, by said particular layered driver, if said I/O request can be filled without access to said at least one attribute stored in said remote storage medium;

if said I/O request can be filled without access to said at least one attribute, then filling said I/O request by accessing any necessary information from said local storage medium; and if said I/O request cannot be filled without access to said at least one attribute, then filling said I/O request by accessing said at least one attribute from said remote storage medium with said particular layered driver.

7. A method for implementing remote file storage as an integral part of an I/O system as recited in claim 6 wherein said step of reading, from said local storage medium, said remote storage attribute is performed by another layered driver included in the plurality of layered drivers and different from the particular layered driver.

8. A method for implementing remote file storage as an integral part of an I/O system as recited in claim 7 further comprising the steps of:
   extracting said tag by said other layered driver; and
   transferring control to said particular layered driver so that said particular layered driver can assume control of processing said I/O request.

9. A method for implementing remote file storage as an integral part of an I/O system as recited in claim 8, wherein said particular layered driver is a first hierarchical storage manager and said plurality of layered drivers includes a second hierarchical storage manager, wherein said step of transferring control comprises the steps of:
   passing said tag to said second hierarchical storage manager without said second hierarchical storage manager responding to said tag; and in turn
   passing said tag to said particular layered driver whereupon said particular layered driver recognizes itself, based on said tag, as the layered driver that can assume responsibility for processing said I/O request.

10. A method for implementing remote file storage as an I/O system primitive in an I/O system that uses a plurality of layered driver means for performing I/O processing, the method comprising the steps of:
    receiving, by a first layered driver means for performing I/O processing, an I/O request to perform a designated I/O operation involving at least one of a file and a directory;
    determining, by said first driver means, that said at least one of the file and the directory has a remotely stored attribute by determining that said at least one of either the file or the directory contains a remote storage attribute stored locally and separately from any user controlled data attribute of said at least one of the file and the directory, said remote storage attribute including:
      a tag identifying a second layered driver means for performing I/O processing as a layered driver means that can assume control of processing I/O requests involving said at least one of the file and the directory; and
      remote storage information representing a location in a remote storage medium at which said remotely stored attribute is stored;
    extracting, by said first layered driver means, said tag and said remote storage information from said remote storage attribute; and
    passing said tag and said remote storage information to said second layered driver means, whereupon said second layered driver means assumes control of processing said designated I/O request.

11. A method for implementing remote file storage as an I/O primitive as recited in claim 10, wherein the step of passing said tag and said remote storage information to said second layered driver means comprises the step of said second layered driver means recognizing itself, based on the tag, as the layered driver means that can assume control of processing I/O requests involving said at least one of the file and the directory.

12. A method for implementing remote file storage as an I/O primitive as recited in claim 11 wherein said second driver means processes said I/O request by performing at least tho following steps:
    determining if said designated I/O request can be filled without access to remotely stored information;
    if said designated I/O request can be filled without access to said remotely stored attribute, then filling said designated I/O request by accessing any necessary information from a local storage medium; and
    if said designated I/O request cannot be filled without access to said remotely stored attribute, then filling said designated I/O request by accessing said remotely stored attribute from said remote storage medium.

13. A computer-readable medium having a plurality of data fields stored thereon and representing a data structure, comprising:
    a first set of data fields stored within a first region of a range of storage addresses allocated for storing said data structure, said first set of data fields storing user attributes and said first set of data fields being accessible by a user to retrieve said user attributes; and
    a second set of data fields stored within a second region of said range of storage addresses allocated for storing said data structure, said second set of data fields storing I/O system attributes of said data structure, said I/O system attributes being adapted for access by one or more of a plurality of layered drivers included in an I/O system, said second set of data fields comprising:
      a remote storage attribute data field capable of storing a remote storage attribute comprising:
        a tag that identifies one of said plurality of layered drivers as a specified driver that is capable of selecting portions of said data structure that are to be stored on another, remote computer-readable medium; and
        means for storing information that is to represent a location within said other, remote computer-readable medium at which said portions are to be stored.

14. A computer-readable medium as recited in claim 13 wherein said information enables said specified driver to locate and retrieve said portions of said data structure when necessary.

15. A computer-readable medium as recited in claim 14 wherein said means for storing information comprises information that identifies said portions of said data structure that have been stored on said other, remote storage medium.

16. A computer-readable medium having computer-executable instructions, said computer-executable instructions comprising:
    first layered driver means for performing I/O processing in an I/O system, said first layered driver means comprising means for reading a locally-stored, remote storage attribute associated with at least one of a file and a directory that has a remotely stored attribute when said I/O system receives an I/O request involving said at least one of the file and the directory, said remote storage attribute including:
      a tag identifying a second layered driver means for performing I/O processing in said I/O system as a layered driver means for assuming control of said I/O request; and
      remote storage information representing a location in a remote storage medium at which said remotely stored attribute is stored;
    said second layered driver means, wherein said second layered driver means is adapted for assuming control of said I/O request;
    means for interrupting I/O processing being performed by said first layered driver means in response to said remote storage attribute having been read by said means for reading; and means for transferring control for processing said I/O request from said first layered driver means to said second layered driver means such that said second layered driver means assumes control of processing said I/O request in response to said tag.

17. A computer-readable medium having computer-executable instructions as recited in claim 16, wherein:

said second layered driver means is a first hierarchical storage manager, said second layered driver means assuming control for processing I/O requests when tags having first specified values are read from remote storage attributes by said first layered driver means; and said computer-executable instructions further comprise a second hierarchical storage manager that assumes control for processing I/O request when tags having second specified values are read by from remote storage attributes by said first layered driver means.

18. A computer-readable medium having computer-executable instructions as recited in claim 16, wherein said first layered driver means comprises means for passing said remote storage information to said second layered driver means.

19. A computer-readable medium having computer-executable instructions as recited in claim 16, wherein said second layered driver means comprises means for determining, in response to said tag, that said second layer driver means, itself, can assume control for processing said I/O request.

* * * * *

UNITED STATES PATENT AND TRADEMARK OFFICE
CERTIFICATE OF CORRECTION

Page 1 of 3

PATENT NO. : 5,978,815

DATED : November 2, 1999

INVENTOR(S) : Luis Felipe Cabrera, Gary D. Kimura, Thomas J. Miller, Brian D. Andrew It is certified that error appears in the above-identified patent and that said Letters Patent is hereby corrected as shown below:

Col. 8, ln. 45: after "to select" change "an" to --and--

Col. 14, ln. 32: after "mechanism" change "exist" to --exists--

Col. 25, ln. 65: after "generally" change "included" to --include--

Col. 27, ln. 16: after "of any" and before "these" add --of--

Col. 28, ln. 43: after "said at " change "last" to --least--

Col. 29, ln. 65: after "least" change "tho" to --the--

Col. 31, ln. 15: after "I/O" change "request" to --requests--

Cover Page: after list of "U.S. Patent Documents" insert the following "Other Documents":
--Storage Management, Products & Services, DMIG/DMAPI FIX, Web Site: www.auspex.com/products/storage/dmig.html--

--Paricia Seybold Group, Distributed File Systems, by Mitchell I. Kramer, December 1996 Prepared for IBM Corporation and Transacr Corporations, www.transarc.com/afs/transarc.com/public/www/public/prodserv/product/DFS/Seybold/dfs.html--

--Kirk, Martin, X/Open Distributed Systems Management Programme Overview May 1996, Distributed Systems Management Overview, www.xoweb.xopen.co.uk/public/tech/sysman/dsmbrief.htm--

UNITED STATES PATENT AND TRADEMARK OFFICE
CERTIFICATE OF CORRECTION

PATENT NO. : 5,978,815

DATED : November 2, 1999

INVENTOR(S) : Luis Felipe Cabrera, Gary D. Kimura, Thomas J. Miller, Brian D. Andrew It is certified that error appears in the above-identified patent and that said Letters Patent is hereby corrected as shown below:

--SCO Distributed Systems Management-White Paper, Industry & Standards Efforts, www.sco.com/products/baseos/family/sysmgt4.htm--

--Holton, Mike, Das, Raj, and Graphics, Silicon, Inc. XFS: A Next Generation Journalled 64-Bit Filesystem with Guaranteed Rate I/O, Silicon Graphics, 1995, XFS White Paper www.sgi.fr/Technology/xfs-whitepaper.html--

--ADSTAR Distributed Storage Manager- ADSM and HPSS Product Comparison, IBM Storage Software, ADSM-Comparison with HPSS, www.starage.ibm.com/software/adsm/adwhpss.htm--

--ADSTAR Distributed Storage Manager-Comparison with HPSS Frequently Asked Questions, IBM Storage Software, Updated January 27, 1997, ADSM and HPSS Products Comparison FAQ, www.storage.ibm.com/software/adsm/adhpss10.htm--

--ADSTAR Distributed Storage Manager Frequently Asked Questions, IBM Storage Software, Updated April 25, 1197, ADSM-Frequently Asked Questions (FAQ), www.storage.ibm.com/software/adsm/adfaq.htm--

--ADSTAR Distributed Storage Manager Product Overview Continued, IBM Storage Software, Updated July 3, 1997, ADSM-Product Overview Continued, www.storage.ibm.com/software/adsm/adprov.htm--

UNITED STATES PATENT AND TRADEMARK OFFICE
CERTIFICATE OF CORRECTION

Page 3 of 3

PATENT NO. : 5,978,815
DATED : November 2, 1999
INVENTOR(S) : Luis Felipe Cabrera, Gary D. Kimura, Thomas J. Miller, Brian D. Andrew It is certified that error appears in the above-identified patent and that said Letters Patent is hereby corrected as shown below:

--ADSTAR Distributed Storage Manager Basic Concepts IBM Storage Software Updated October 31, 1997 ADSM Try and Buy-Basic Concepts www.storage.ibm.com/software/adsm/adbasics.htm--

--ADSTAR Distributed Storage Manager Product Overview, IBM Storage Software ADSM Product Family Overview, www.storage.ibm.com/software.adsm/ads0fam.htm --Teaff, Danny, Watson, Dick, and Coyne, Bob, The Architecture of the High Performance Storage System (HPSS), High Performance of Storage System, www.esdis.gsfc.nasa.gov/msst/A4_1.html--

--"CAE Specification, System Management: Data Storage Management (XDSM)" API, published by The Open Group, February 1997--

Signed and Sealed this

Fifth Day of December, 2000

*Attest:*

Q. TODD DICKINSON

*Attesting Officer*     *Director of Patents and Trademarks*